(12) United States Patent
Takahashi et al.

(10) Patent No.: US 12,130,995 B2
(45) Date of Patent: Oct. 29, 2024

(54) ELECTRODE MEMBER

(71) Applicant: Alps Alpine Co., Ltd., Tokyo (JP)

(72) Inventors: Toru Takahashi, Niigata-ken (JP);
Masayoshi Takeuchi, Niigata-ken (JP);
Tetsuya Suzuki, Niigata-ken (JP);
Yusuke Umetsu, Tokyo (JP); Hiroki Majima, Niigata-ken (JP)

(73) Assignee: Alps Alpine Co., Ltd., Tokyo (JP)

( * ) Notice: Subject to any disclaimer, the term of this patent is extended or adjusted under 35 U.S.C. 154(b) by 0 days.

(21) Appl. No.: 18/359,656

(22) Filed: Jul. 26, 2023

(65) Prior Publication Data
US 2024/0019971 A1 Jan. 18, 2024

Related U.S. Application Data

(63) Continuation of application No. PCT/JP2021/048509, filed on Dec. 27, 2021.

(30) Foreign Application Priority Data

Mar. 1, 2021 (JP) ................. 2021-032048

(51) Int. Cl.
*G06F 3/044* (2006.01)
(52) U.S. Cl.
CPC .......... *G06F 3/0446* (2019.05); *G06F 3/0448* (2019.05); *G06F 2203/04111* (2013.01); *G06F 2203/04112* (2013.01)
(58) Field of Classification Search
CPC .............. G06F 3/0446; G06F 3/0448; G06F 2203/04111; G06F 2203/04112; G06F 3/044
See application file for complete search history.

(56) References Cited

U.S. PATENT DOCUMENTS

2014/0186996 A1  7/2014  Takeuchi et al.
2014/0225839 A1*  8/2014  Dunphy ................ G06F 3/0412
345/173

(Continued)

FOREIGN PATENT DOCUMENTS

JP   2014-127115   7/2014
JP   2014-130893   7/2014

(Continued)

OTHER PUBLICATIONS

International Search Report from International Application No. PCT/JP2021/048519 dated Jan. 27, 2022.

*Primary Examiner* — Patrick N Edouard
*Assistant Examiner* — Joseph P Fox
(74) *Attorney, Agent, or Firm* — Beyer Law Group LLP

(57) ABSTRACT

An electrode member includes a first electrode pattern and a second electrode pattern. In each of the first electrode pattern and the second electrode pattern, first end portion wires of the first thin metal wires form a pair across the insulation gap, and first end surfaces of the paired first end portion wires are located so as to include portions that face each other with a predetermined distance therebetween in a direction that intersects a first direction. In each of the first electrode pattern and the second electrode pattern, second end portion wires of the second thin metal wires form a pair across the insulation gap, and second end surfaces of the paired second end portion wires are located so as to include portions that face each other with a predetermined distance therebetween in a direction that intersects a second direction.

10 Claims, 12 Drawing Sheets

(56) References Cited

U.S. PATENT DOCUMENTS

| | | | |
|---|---|---|---|
| 2015/0193035 A1* | 7/2015 | Ullmann | G06F 3/0446 |
| | | | 345/173 |
| 2015/0309617 A1 | 10/2015 | Yoshiki | |
| 2016/0103526 A1 | 4/2016 | Sohn | |
| 2017/0017335 A1 | 1/2017 | Takahashi | |
| 2018/0039360 A1 | 2/2018 | Akimoto et al. | |
| 2018/0049318 A1* | 2/2018 | Maki | H05K 1/189 |

FOREIGN PATENT DOCUMENTS

| | | |
|---|---|---|
| JP | 2016-192192 | 11/2016 |
| JP | 2018/022322 | 2/2018 |
| JP | 2018-120397 | 8/2018 |
| WO | 2015/146277 | 10/2015 |

\* cited by examiner

ELECTRODE MEMBER

CLAIM OF PRIORITY

This application is a Continuation of International Application No. PCT/JP2021/048509 filed on Dec. 27, 2021, which claims benefit of Japanese Patent Application No. 2021-032048 filed on Mar. 1, 2021. The entire contents of each application noted above are hereby incorporated by reference.

BACKGROUND OF THE INVENTION

1. Field of the Invention

The present invention relates to an electrode member capable of being used in an input region of a touch sensor.

2. Description of the Related Art

As existing electrode members for touch sensor, an electrode and a light-transmissive conductive material have been proposed in Japanese Unexamined Patent Application Publication Nos. 2016-192192 and 2014-127115, respectively. In Japanese Unexamined Patent Application Publication No. 2016-192192, as a configuration that is easily formed and that improves visibility of an electrode pattern, an electrode including at least a first electrode pattern region and a seconds electrode pattern region is disclosed. Each of the first and second electrode pattern regions consists of a plurality of grid-like unit electrode patterns each formed by a plurality of band electrodes extending in a first direction and a second direction intersecting each other on an electrode forming surface. The first and second electrode pattern regions are disposed adjacent to each other and electrically separated in an adjacent portion. In addition, in the adjacent portion, an end portion of the band electrode in the first electrode pattern region and an end portion of a band electrode in the second electrode pattern region have an overlapping portions in which the end portions overlap each other in directions intersecting the first direction and the second direction on the electrode forming surface.

In Japanese Unexamined Patent Application Publication No. 2014-127115, as a configuration that is suitable as a light-transmissive electrode and that reduces the visibility and reduces the occurrence of short circuits, a light-transmissive conductive material is disclosed that includes, on a substrate, a sensor portion formed by a metal pattern electrically connected to a terminal portion via a wiring portion and a dummy portion formed by a metal pattern not electrically connected to a terminal portion via the wiring portion. In the light-transmissive conductive material, the boundary between the sensor portion and the dummy portion has a shape formed by cutting the metal pattern constituting the sensor portion by an imaginary boundary line and shifting at least one of the sensor portion and the dummy portion along the imaginary boundary line.

SUMMARY OF THE INVENTION

However, in the electrode described in Japanese Unexamined Patent Application Publication No. 2016-192192, since the end portions of the band electrodes of two adjacent electrode pattern regions overlap each other to form an overlapping portion, the electrode is easily visible in this region. Furthermore, in the overlapping region, since the end portions of the band electrodes are close to each other, an etchant tends to remain between the end portions, and the band electrodes tend to be over-etched. As a result, the distance between two adjacent electrode pattern regions tends to increase, and the shape of the electrode may not be the desired shape. In addition, in the light-transmissive conductive material described in Japanese Unexamined Patent Application Publication No. 2014-127115, since the end portions of adjacent metal patterns are close to each other, the desired shape may not be obtained due to over-etching.

The present invention provides an electrode member having a first electrode pattern and a second electrode pattern, each formed in a mesh-like shape with thin metal wires, disposed with an insulation gap therebetween and capable of reducing the visibility of adjacent thin metal wires through the insulation gap so that, in particular, it is less likely that the adjacent thin metal wires are seen as being separated from each other at the boundary portion. The present invention further provides the electrode member capable of reducing the over-etching of the thin metal wires and obtaining a desired shape.

According to an aspect of the present invention, an electrode member includes a first electrode pattern and a second electrode pattern formed facing the first electrode across an insulation gap. Each of the first electrode pattern and the second electrode pattern is formed in a mesh-like shape with a plurality of first thin metal wires extending in a first direction that intersects a direction in which the insulation gap extends and a plurality of second thin metal wires extending in a second direction that intersects both the direction in which the insulation gap extends and the first direction. Each of the first thin metal wires includes a first end portion wire in an end portion of one of the first electrode pattern and the second electrode pattern adjacent to the insulation gap, the first end portion wires in the first electrode pattern and the second electrode pattern form a pair across the insulation gap, and first end surfaces of the first end portion wires that form the pair are located so as to include portions that face each other with a predetermined distance therebetween in a direction that intersects the first direction. Each of the second thin metal wires includes a second end portion wire in the end portion of one of the first electrode pattern and the second electrode pattern adjacent to the insulation gap, the second end portion wires in the first electrode pattern and the second electrode pattern form a pair across the insulation gap, and second end surfaces of the second end portion wires that form the pair are located so as to include portions that face each other with a predetermined distance therebetween in a direction that intersects the second direction. This configuration can reduce the visibility of thin metal wires adjacent to each other with the insulation gap therebetween and can obtain a desired shape by reducing over-etching of the thin metal wire.

In the above-described electrode member, the paired first end portion wires may extend in the first direction and may be disposed so as to be shifted from each other by a predetermined spacing in a direction that intersects the first direction, and the paired second end portion wires may extend in the second direction and may be disposed so as to be shifted from each other by the predetermined spacing in a direction that intersects the second direction. By arranging the first end portion wires and the second end portion wires in this manner, the thin metal wires adjacent to each other with the insulation gap therebetween are easily recognized as a continuous wire through the insulation gap, and it is less likely that the adjacent thin metal wires are seen as being separated from each other at the boundary portion. In addition, over-etching of the thin metal wire is reduced and, thus, a desired shape can be obtained.

In the above-described electrode member, the paired first end portion wires each may include a portion extending at an angle to the first direction so that the first end surfaces are separated by a predetermined distance in a direction intersecting the first direction, and the paired second end portion wires each may include a portion extending at an angle to the second direction so that the second end surfaces are separated by the predetermined distance in a direction intersecting the second direction. By arranging the first end portion wires and the second end portion wires in this manner, the thin metal wires adjacent to each other with the insulation gap therebetween are easily seen as being continuous. In addition, over-etching of the thin metal wire is reduced and, thus, a desired shape can be obtained.

In this case, it may be desirable for the first end portion wire to extend from an intersection position with the second thin metal wire in a direction that intersects the first direction and for the second end portion wire to extend from the intersection position with the first thin metal wire in a direction that intersects the second direction. This configuration makes it easier to secure the insulation gap and, thus, over-etching can be easily reduced.

In the above-described electrode member, it is desirable that each of the first end surface and the second end surface has a tapered shape. This configuration can reduce over-etching of the thin metal wire and, thus, a desired shape can be obtained.

In the above-described electrode member, it is desirable that each of the first end surface and the second end surface has a curved surface shape. This configuration can reduce over-etching of the thin metal wire and, thus, a desired shape can be obtained.

In the above-described electrode member, it may be desirable that the insulation gap have a predetermined width and extend, and the width of the insulation gap be greater than or equal to 0.5 times and less than or equal to 3.5 times a width of the first thin metal wire. This configuration may reduce the visibility of thin metal wires adjacent to each other with the insulation gap therebetween and may reduce over-etching of the thin metal wires to make it easier to obtain a desired shape.

According to another aspect of the present invention, an electrode member includes a first electrode pattern and a second electrode pattern each formed as a pattern of thin metal wires and an insulation gap that is located between the first electrode pattern and the second electrode pattern and that extends in a third direction. The insulation gap is disposed between the first electrode pattern and the second electrode pattern so that a portion where the thin metal wires are not located is seen through as viewed in the third direction.

Each of the thin metal wires that form the first electrode pattern includes a third end portion wire in an end portion adjacent to the insulation gap, and each of the thin metal wires that form the second electrode pattern includes a fourth end portion wire in an end portion adjacent to the insulation gap. The third end portion wire and the fourth end portion wire face each other across the insulation gap to form a pair and have portions that overlap each other as viewed in a fourth direction that is perpendicular to the third direction. This configuration can reduce the visibility of thin metal wires adjacent to each other with the insulation gap therebetween and can reduce over-etching of the thin metal wires to make it easier to obtain a desired shape.

In the electrode member according to the above-described other aspect, the first electrode pattern may be formed by repeating a basic pattern except for the third end portion wires, and the second electrode pattern may be formed by repeating the basic pattern except for the fourth end portion wires. The basic pattern of the first electrode pattern and the basic pattern of the second electrode pattern may be disposed so as to be separated in the fourth direction, and at least one of the third end portion wire and the fourth end portion wire may be disposed at a location where the thin metal wire that constitutes part of the basic pattern is based on repetition of the basic pattern.

In the electrode member according to the above-described other aspect, the first electrode pattern and the second electrode pattern may be configured by repeating the basic pattern except for the third end portion wires and the fourth end portion wires, and at least one of the third end portion wire and the fourth end portion wire may be disposed so as to be offset from a location where the thin metal wires are based on repetition of the basic pattern.

DESCRIPTION OF THE PREFERRED EMBODIMENTS

An electrode member according to an embodiment of the present invention is described in detail below with reference to the accompanying drawings. While the following description is made with reference to the embodiment applied to a capacitive touch sensor, the embodiment is applicable touch sensors other than a capacitive touch sensor. Furthermore, while the following embodiment is described with reference to an example in which an electrode member is provided on a substrate that is a flat plate, the electrode member can be provided on a substrate other than such a substrate. For example, the electrode member can be provided on a plate member having a concave-convex or curved surface on a forming surface, a curved or deformable material, or a non-plate material, such as a spherical or hemispherical material.

Figure 1:
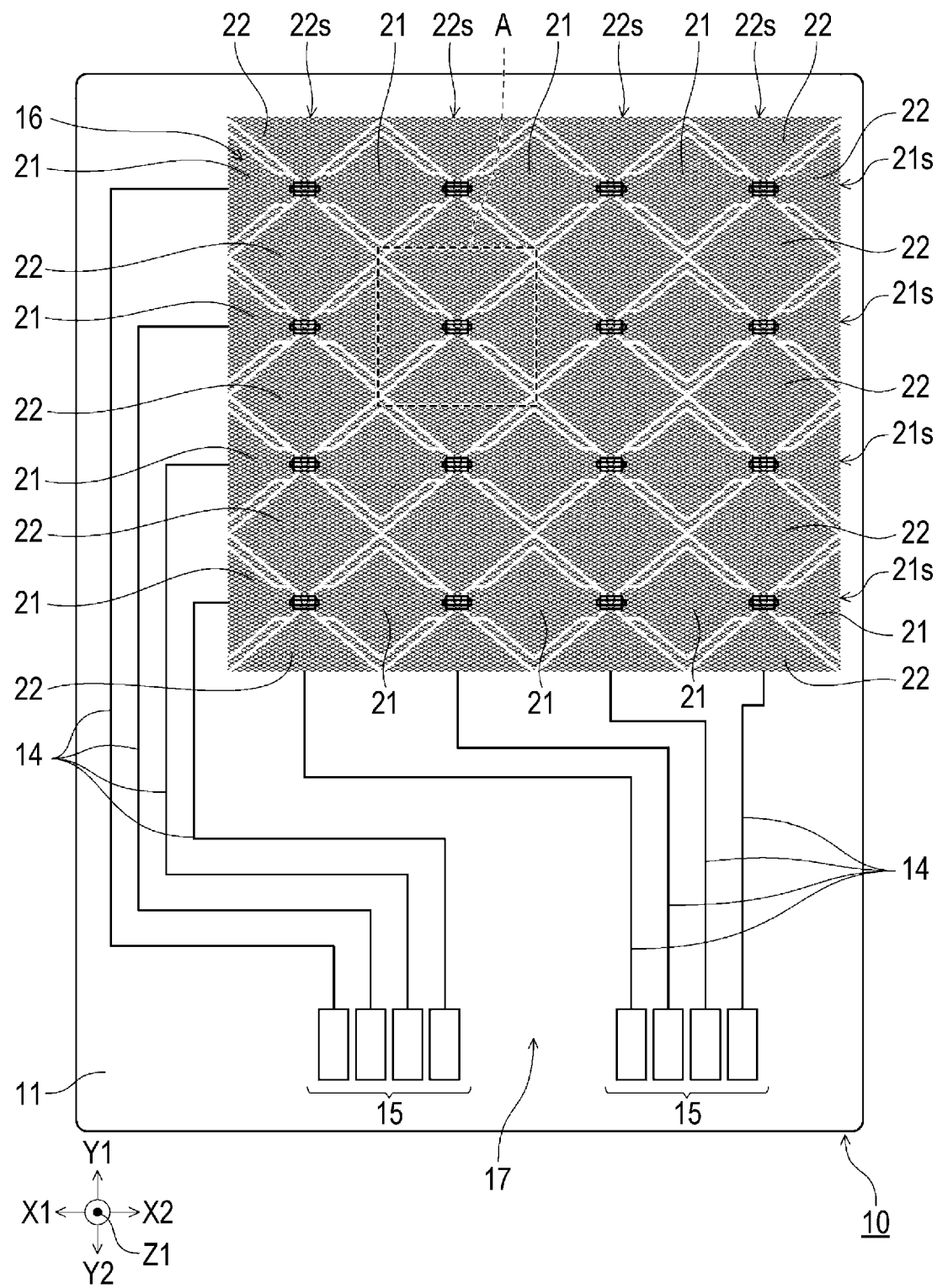
FIG. 1 is a plan view of the schematic configuration of a capacitive touch sensor according to an embodiment of the present invention.
Figure 2:
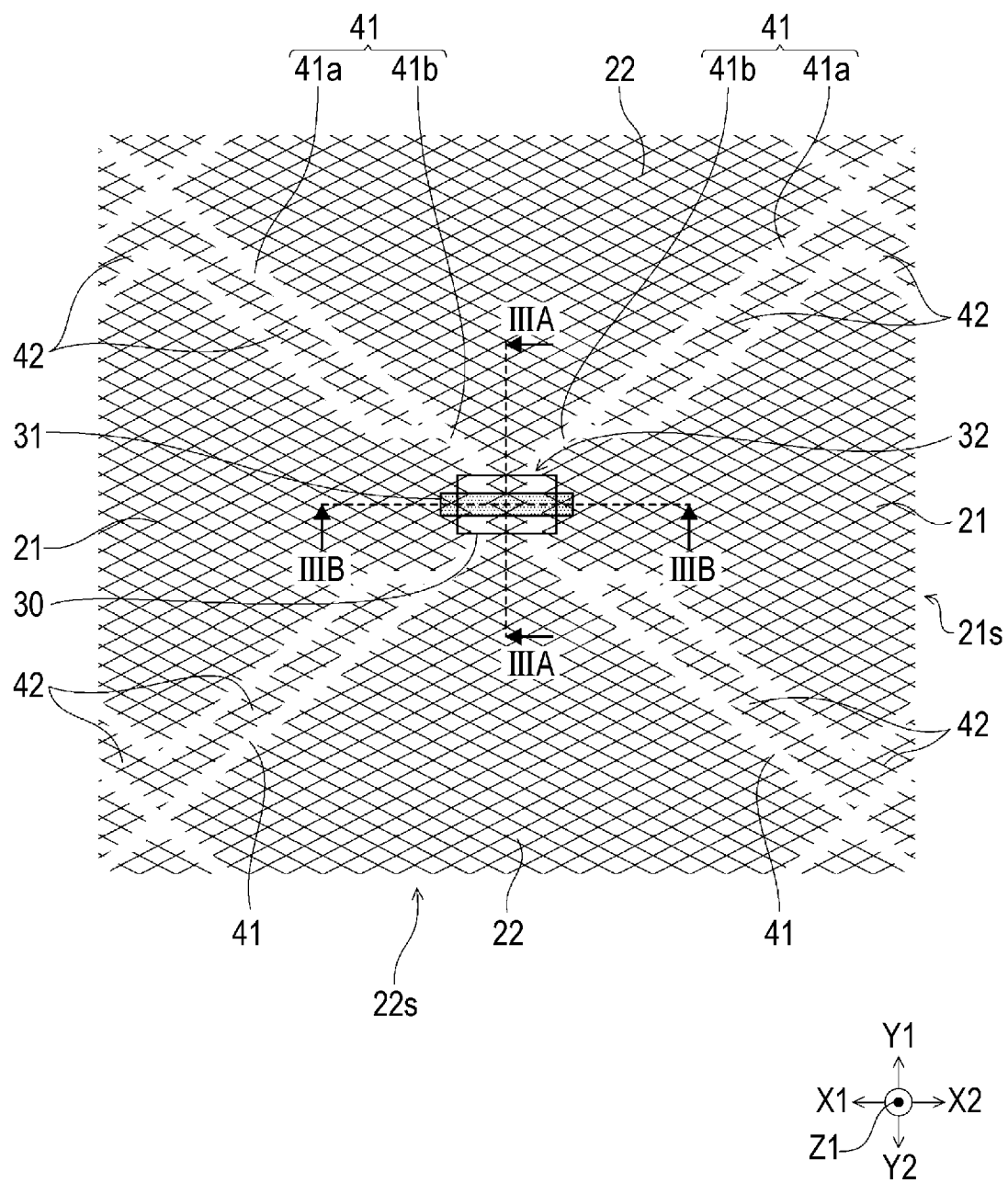
FIG. 2 is an enlarged plan view of a portion A illustrated in FIG. 1.
Figure 3A:
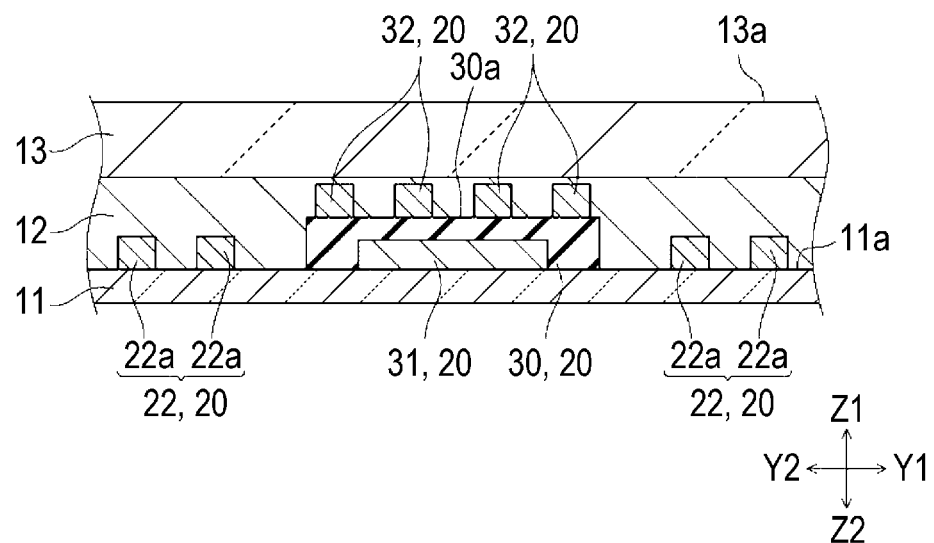
FIG. 3A is a cross-sectional view taken along line IIIA-IIIA of FIG. 2.
Figure 3B:
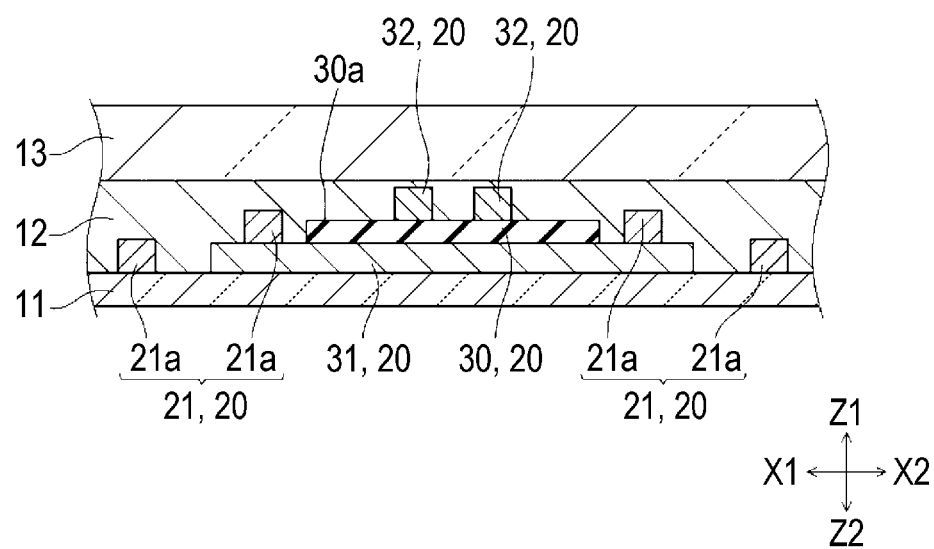
FIG. 3B is a cross-sectional view taken along line of FIG. 2.

FIG. 1 is a conceptual plan view of the configuration of a capacitive touch sensor 10 according to the present embodiment. FIG. 2 is an enlarged plan view of a portion A illustrated in FIG. 1. FIG. 3A is a cross-sectional view taken along line IIIA-IIIA of FIG. 2, and FIG. 3B is a cross-sectional view taken along line IIIB-IIIB of FIG. 2. Note that although the transparent electrode is transparent and, therefore, is originally invisible, the outline of the transparent electrode is illustrated in each of the figures for ease of understanding.

As illustrated in FIG. 1, FIG. 2, or FIG. 3, the capacitive touch sensor 10 according to the present embodiment includes a substrate 11, first transparent electrodes 21, second transparent electrodes 22, an insulating layer 30, bridge wire portions 31, connecting portions 32, an optically clear adhesive layer 12, a panel 13 having translucent property, a detection unit, and a control unit (neither is illustrated). The first transparent electrodes 21, the second transparent electrodes 22, the insulating layer 30, the bridge wire portions 31, and the connecting portions 32 constitute an electrode member 20.

As illustrated in FIG. 3, the panel 13 is provided on the opposite side of the connecting portion 32 11 from the substrate. The optically clear adhesive layer (OCA) 12 is provided between the substrate 11 and the panel 13. The insulating layer 30 made of an insulating material is provided between the substrate 11 and the connecting portion 32. In a portion where the connecting portion 32 is provided, the optically clear adhesive layer 12 is provided between the connecting portion 32 and the panel 13.

The substrate 11 is translucent and is formed of a resin-based substrate including a resin film, such as polyethylene terephthalate (PET), cyclic olefin copolymer, cyclo-olefin polymer, or another polyolefin polymer substrate, a glass substrate, or the like. The first transparent electrode 21 and the second transparent electrode 22 are provided on a first surface 11a, which is one of the principal surfaces of the substrate 11.

The panel 13 is translucent, and an operator's finger or another operation body is brought into contact or proximity to the transparent electrode member from the side with the panel 13 to perform operations on the transparent electrode member. The material of the panel 13 includes, but not limited to, resin-based substrates, such as a polyethylene terephthalate, polyolefin polymer, polycarbonate, polymethylmethacrylate (PMMA) substrate, and a glass substrate. A hard coat layer in which translucent inorganic fine particles (for example, zirconia and titania) are dispersed in a resin matrix may be provided on the resin-based substrate. The panel 13 is bonded to the substrate 11 via the optically clear adhesive layer 12 provided between the substrate 11 and the panel 13. The optically clear adhesive layer 12 is made of an acrylic adhesive, double-sided adhesive tape, or the like.

As used herein, the terms "transparent" and "translucent property" refer to a state in which a visible light transmittance is 50% or higher (preferably 80% or higher). Furthermore, it is desirable that the haze value be 6% or less. The terms "light-shielding" and "light-shielding property" herein refer to a state in which the visible light transmittance is less than 50% (preferably less than 20%).

The capacitive touch sensor 10 has a detection region 16 and a non-detection region 17, as viewed in a normal direction of the surface 13a of the panel 13 (a Z1-Z2 direction). The detection region 16 is a region that can be operated by a finger or another operation body, and the non-detection region 17 is a frame-like region located on the outer periphery of the detection region 16. The non-detection region 17 is light-shielded by a decorative layer (not illustrated), and light from the panel 13 to the substrate 11 (for example, the outside light) and light from the substrate 11 to the panel 13 (for example, light from the backlight of a display device used in combination with the capacitive touch sensor 10) are less likely to pass through the non-detection region 17.

The capacitive touch sensor 10 has a configuration in which first electrode-connected bodies 21s (first electrode layers) and second electrode-connected bodies 22s (second electrode layers) are provided on one of the principal surfaces (the first surface 11a) of the substrate 11, that is, on the same surface.

The first electrode-connected bodies 21s are disposed in the detection region 16 as first electrode layers having translucent property and each include the plurality of first transparent electrodes 21. The first transparent electrodes 21 are connected in the X1-X2 direction via the elongated bridge wire portions 31. The first electrode-connected bodies 21s each including the plurality of first transparent electrodes 21 connected in the X1-X2 direction are arranged so as to be spaced apart in the Y1-Y2 direction. Each of the bridge wire portions 31 is formed as a separate body from the first transparent electrode 21. The bridge wire portion 31 electrically connects adjacent two of the adjacent first transparent electrodes 21 to each other.

The second electrode-connected bodies 22s are disposed in the detection region 16 as second electrode layers having translucent property and include the plurality of second transparent electrodes 22. The second transparent electrodes 22 are connected in the Y1-Y2 direction via the elongated connecting portions 32. The second electrode-connected bodies 22s each having the plurality of second transparent electrodes 22 connected in the Y1-Y2 direction are arranged so as to be spaced apart in the X1-X2 direction. Each of the connecting portions 32 are formed as an integral part of the second transparent electrode 22. The Y1-Y2 direction intersects the X1-X2 direction. For example, the Y1-Y2 direction perpendicularly intersects the X1-X2 direction.

The first transparent electrode 21 is formed in a mesh-like shape with first thin metal wires extending in a first direction and second thin metal wires extending in a second direction that intersects the first direction. The second transparent electrode 22 and the connecting portion 32 are formed in a mesh-like shape with the first thin metal wires that are common to the first transparent electrode 21 extending in the first direction and in the same layer as the first transparent electrode 21 and the second thin metal wires extending in the second direction that intersect with the first direction. In FIG. 3A, the first thin metal wires and second thin metal wires of the second transparent electrode 22 are collectively denoted as "thin metal wires 22a", and in FIG. 3B, the first thin metal wires and second thin metal wires of the first transparent electrode 21 are collectively denoted as "thin metal wires 21a". The first thin metal wires and second thin metal wires can be formed by etching a metal layer. The etching is performed to form the thin metal wires (the first thin metal wires and second thin metal wires) from the metal layer so that some of the thin metal wires are not continuous. Thus, the first transparent electrodes 21, the second transparent electrodes 22, and the connecting portions 32 that are not electrically connected can be formed. Examples of a metal used for the metal layer include metal materials, such as Cu, Ag, Au, Ni, and alloys, such as CuNi and AgPd. By configuring the transparent electrode using thin metal wires, contact resistance can be reduced. In addition, visibility of the transparent electrode can be decreased, the occurrence of short circuit between electrodes can be reduced, and the area of the transparent electrode can be easily increased. Furthermore, an electrode member that is resistant to bending can be easily provided. The arrangement and shape of the thin metal wires are described below.

The bridge wire portion 31 is made of a transparent conductive oxide material, such as ITO (indium tin oxide) or IZO (indium zinc oxide) and is provided on an index matching layer (IM layer) (not illustrated) provided on the substrate 11. This is advantageous in terms of invisibility, that is, in making the pattern less visible, as compared with the case where the bridge wire portion 31 is provided on the insulating layer 30.

An insulating region 41 is provided around the first electrode-connected body 21s and the second electrode-connected body 22s so as to expose the first surface 11a of the substrate 11 and extend along the outer edges of the first transparent electrode 21 and the second transparent electrode 22. The insulating region 41 has such a width that can insulate the adjacent first transparent electrode 21 and second transparent electrode 22 from each other. The insulating region 41 includes a base portion 41a and a narrower portion 41b having a width narrower than that of the base portion 41a. The narrower portion 41b is provided in the vicinity of the bridge wire portion 31 and the connecting portion 32.

The base portion 41a has an optical adjustment region 42 (a dummy portion) thereinside when viewed in the normal direction of the first surface 11a of the substrate 11. The narrower portion 41b is not provided with the optical adjustment region 42. Like the first transparent electrode 21 and the second transparent electrode 22, the optical adjustment region 42 is formed in a mesh-like shape with the first thin metal wires and the second thin metal wires. The optical adjustment region 42 is not formed at an end portion of the base portion 41a in the width direction. As a result, the first transparent electrode 21 and second transparent electrode 22 adjacent to each other are insulated from each other by the insulating region 41. In addition, like the first transparent electrode 21 and second transparent electrode 22, the optical adjustment region 42 is formed in a mesh-like shape with the first thin metal wires and the second thin metal wires, so that the visibility of the boundary portion between the first transparent electrode 21 and the second transparent electrode 22 can be reduced. When the first transparent electrode 21 and the second transparent electrode 22 are formed by etching the metal layer, the optical adjustment region 42 consisting of thin metal wires can be formed by etching the metal layer in the same manner as for the electrodes.

The insulating layer 30 is provided on a surface of the bridge wire portion 31 that connects between the first transparent electrodes 21. A space between the bridge wire portion 31 and the second transparent electrode 22 is filled with the insulating layer 30. For example, a novolac resin (a resist) is used as the insulating layer 30.

The connecting portion 32 is formed in a mesh-like shape with the first thin metal wires and the second thin metal wires, like the first transparent electrode 21 and the second transparent electrode 22. The connecting portion 32 covers the surface of the insulating layer 30 and is formed integrally with the second transparent electrodes 22 located on either side of the insulating layer 30 in the Y1-Y2 direction. That is, the connecting portion 32 and the second transparent electrode 22 are continuous in a mesh-like shape in which the first thin metal wires and the second thin metal wires of each of the connecting portion 32 and the second transparent electrode 22 are continuous. As a result, the connecting portion 32 electrically connects the two adjacent second transparent electrodes 22 to each other. When the first transparent electrode 21 and the second transparent electrode 22 are formed by etching a metal layer, the connecting portion 32 can be formed by forming the metal layer so as to cover the insulating layer 30 and etching the metal layer such that a mesh continuous with the second transparent electrodes 22 is formed from the metal layer covering the insulating layer 30.

The connecting portion 32 that connects between two adjacent second transparent electrodes 22 is provided on the surface of the insulating layer 30 provided for the surface of the bridge wire portion 31. Thus, the insulating layer 30 is interposed between the bridge wire portion 31 and the connecting portion 32, and the first transparent electrode 21 and the second transparent electrode 22 are electrically insulated from each other. In the capacitive touch sensor 10, since the first transparent electrodes 21 and the second transparent electrodes 22 are provided on the same surface (the first surface 11a of the substrate 11), the thickness of the capacitive touch sensor 10 can be reduced.

The capacitive touch sensor 10 according to the present embodiment has been described with reference to an example of the configuration in which the connecting portion 32 is formed, as an integral part of the second transparent electrode 22, on the surface 30a of the insulating layer 30 covering the bridge wire portion 31 so as to extend in the Y1-Y2 direction and constitute the second electrode-connected body 22s. However, the layout of the first electrode-connected body 21s and the second electrode-connected body 22s at the intersection portion is not limited to that described in the above-described embodiment. For example, the plurality of second transparent electrodes 22 of the second electrode-connected body 22s may be arranged side by side in the Y1-Y2 direction so as to be separated from each other, and a member having a structure similar to the bridge wire portion 31 may be provided between two adjacent second transparent electrodes 22 to constitute the second electrode-connected body 22s. In this case, the first electrode-connected body 21s may include a member similar to the connecting portion 32 of the second electrode-connected body 22s instead of including the bridge wire portion 31. That is, a plurality of first transparent electrodes 21 may be aligned in the X1-X2 direction, and two of the adjacent first transparent electrodes 21 may be electrically connected by a member that is integrated with the two first transparent electrodes 21 and that is formed with mesh-like thin metal wires (corresponding to the connecting portion 32).

As illustrated in FIG. 1, the non-detection region 17 has, formed therein, a plurality of wire portions 14 each led out from one of the first electrode-connected bodies 21s and second electrode-connected bodies 22s. Each of the first electrode-connected body 21s and the second electrode-connected body 22s is electrically connected to one of the wire portions 14 via a connecting wire extending from the detection region 16 to the non-detection region 17. Since FIG. 1 is a schematic illustration, the connecting wire is not illustrated. Each of the wire portions 14 is connected to one of external connection portions 15 that are electrically connected to a flexible printed circuit board (not illustrated). That is, each of the wire portions 14 electrically connects one of the first electrode-connected bodies 21s and the second electrode-connected bodies 22s to one of the external connection portions 15. The external connection portions 15 are electrically connected to the flexible printed circuit board (not illustrated) via, for example, conductive paste or a material containing a metal, such as Cu, Cu alloy, CuNi alloy, Ni, Ag, or Au.

A printed-wiring board (not illustrated) connected to the flexible printed circuit board has, mounted thereon, a detection unit (not illustrated) that detects changes in capacitance between an operation body and each of the transparent electrodes (primarily the first transparent electrodes 21 and the second transparent electrode 22) and a control unit that calculates the position of the operation body on the basis of signals from the detection unit. Although a detailed description is not given, integrated circuits are used as the detection unit and the control unit.

The wire portions 14 are formed of a material containing a metal, such as Cu, Cu alloy, CuNi alloy, Ni, Ag, or Au. The wire portions 14 are stacked on and electrically connected to the above-described connecting wires within the non-detection region 17. Like the first transparent electrodes 21 and second transparent electrodes 22, the connecting wires are formed in a mesh-like shape with the first thin metal wires and second thin metal wires.

The wire portions 14 are provided in a portion located inside of the non-detection region 17 of the first surface 11a of the substrate 11. In addition, like the wire portions 14, the external connection portions 15 are provided in a portion located inside of the non-detection region 17 of the first surface 11a of the substrate 11.

In FIG. 1, for ease of understanding, the wire portions 14 and the external connection portions 15 are illustrated as visible. However, in reality, a light-shielding decorative layer (not illustrated) is provided in the portion located inside of the non-detection region 17. For this reason, when the capacitive touch sensor 10 is viewed from the side with the panel 13, the wire portions 14 and the external connection portions 15 are hidden by the decorative layer and are invisible. Any material having light-shielding properties can be used as the decorative layer. The decorative layer may have insulating properties.

In the capacitive touch sensor 10, when a finger, which is an example of the operation body, is brought into contact with the surface 13a of the panel 13, capacitance occurs between the finger and the first transparent electrode 21 near the finger and between the finger and the second transparent electrode 22 near the finger. The capacitive touch sensor 10 can detect a change in capacitance at this time using the detection unit and calculate the contact position of the finger on the basis of the capacitance changes using the control unit. That is, the capacitive touch sensor 10 detects the Y coordinate of the finger position on the basis of the capacitance changes between the finger and the first electrode-connected body 21s and the X coordinate of the finger position on the basis of the capacitance changes between the finger and the second electrode-connected body 22s (a self-capacitance detection type).

However, the capacitive touch sensor 10 may be of a mutual capacitance detection type. That is, the capacitive touch sensor 10 may apply a drive voltage to one row of electrodes of either the first electrode-connected body 21s or the second electrode-connected body 22s (for example, the first electrode-connected body 21s) and detect a change in capacitance between the finger and an electrode of the other of the first electrode-connected body 21s and the second electrode-connected body 22s (for example, the second electrode-connected body 22s). In this case, the capacitive touch sensor 10 detects the Y-coordinate of the finger position by determining which one of the first electrode-connected bodies 21s changes the capacitance when a voltage is applied to the first electrode-connected body 21s and detects the X-coordinate of the finger position by determining which one of the second electrode-connected bodies 22s changes the capacitance.

Figure 4:
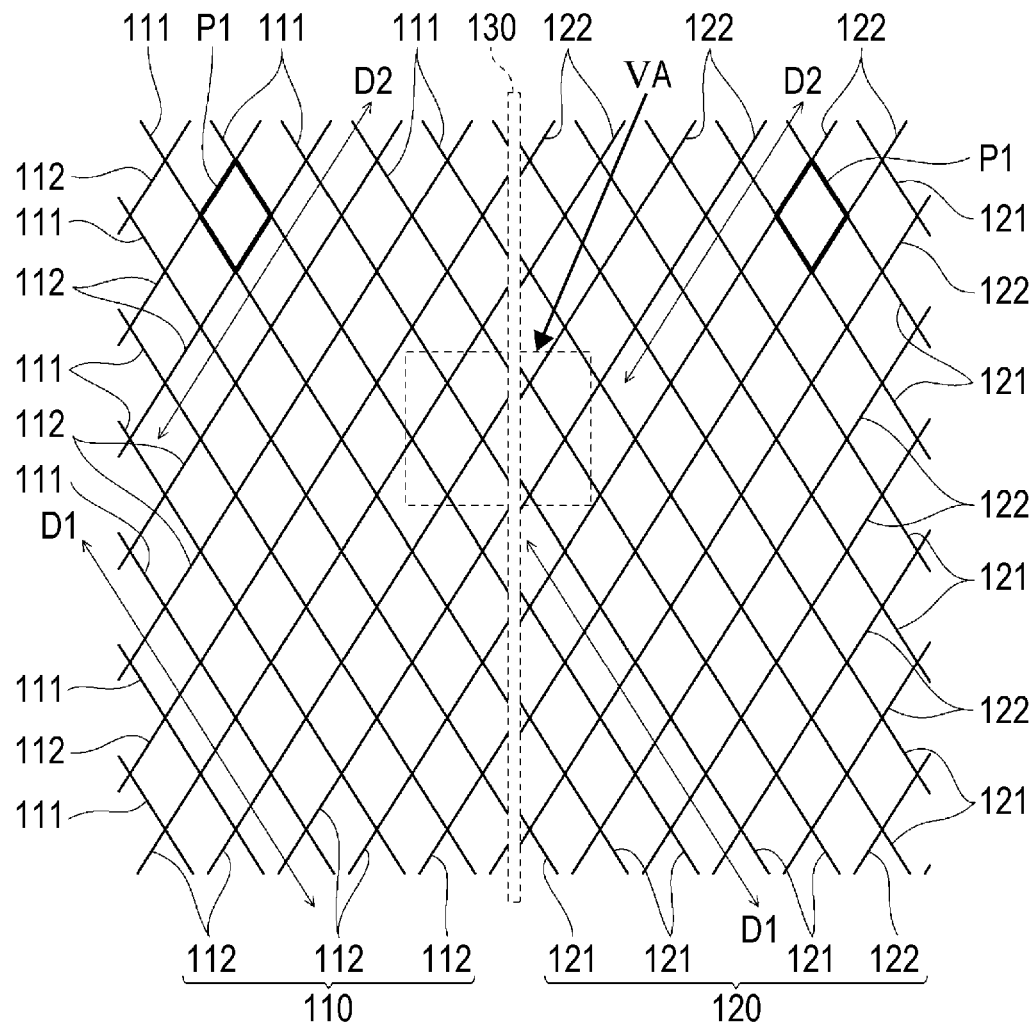
FIG. 4 is a conceptual plan view of the configuration of a first electrode pattern and a second electrode pattern according to the embodiment of the present invention.
Figure 4:
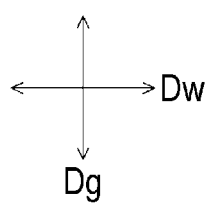
Figure 5A:
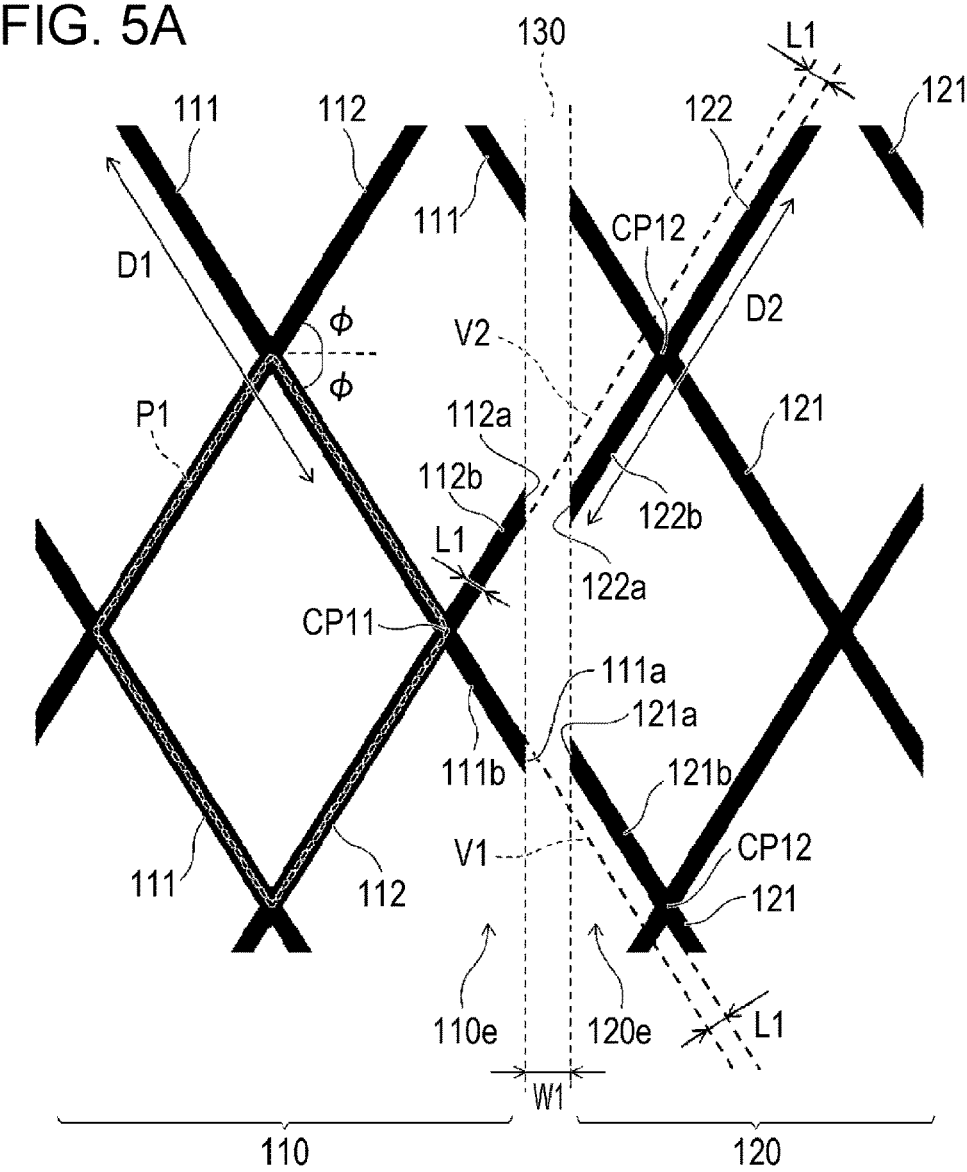
FIG. 5A is an enlarged plan view of a portion VA illustrated in FIG. 4.

An electrode pattern with thin metal wires is described below with reference to FIG. 4 and FIG. 5A. FIG. 4 is a conceptual plan view of the configuration of the first and second electrode patterns according to the present embodiment. FIG. 5A is an enlarged plan view of a portion VA illustrated in FIG. 4.

A first electrode pattern 110 and a second electrode pattern 120 illustrated in FIGS. 4 and 5A are disposed next to each other with an insulation gap 130 having a predetermined width W1 therebetween and are insulated from each other by the insulation gap 130. The first electrode pattern 110 and the second electrode pattern 120 are two electrode patterns adjacent to each other while being insulated. In the configuration illustrated in FIGS. 1 to 3, the first transparent electrode 21 and the second transparent electrode 22 correspond to the two electrode patterns. Alternatively, one of the first transparent electrode 21 and the second transparent electrode 22 and the optical adjustment region 42 correspond to the above-described two electrode patterns.

The first electrode pattern 110 is formed in a mesh-like shape with a plurality of first thin metal wires 111 each extending in a first direction D1 and a plurality of second thin metal wires 112 each extending in a second direction D2 that intersects the first direction D1. The second electrode pattern 120 is formed in a mesh-like shape with a plurality of first thin metal wires 121 each extending in the above-described first direction D1 and a plurality of second thin metal wires 122 each extending in the above-described second direction D2.

The first direction D1 and the second direction D2 are directions different from the direction in which the insulation gap 130 extends (a longitudinal direction Dg, the vertical direction in FIGS. 4 and 5A), and the angle at which the first direction D1 and the second direction D2 intersect can be set to any angle other than 0 degrees. In FIG. 5A, the angle of intersection is 2×ϕ. The first direction D1 extends in a direction at an angle ϕ clockwise from a width direction Dw of the insulation gap 130, and the second direction D2 extends in a direction at an angle ϕ counterclockwise from the width direction Dw.

The first thin metal wires 111 and the second thin metal wires 112 in the first electrode pattern 110 have the same width of L1, and the spacing between the plurality of first thin metal wires 111 and the spacing between the plurality of second thin metal wires 112 are the same. It is desirable that the width of the first thin metal wires 111, the width of the second thin metal wires 112, the spacing between the first thin metal wires 111, and the spacing between the spacing between the second thin metal wires 112 be determined in consideration of the visibility, the contact resistance, and the like of the thin metal wires.

The widths of the first thin metal wires 121 and the second thin metal wires 122 of the second electrode pattern 120 are the same as the widths of the first thin metal wires 111 and the second thin metal wires 112 of the first electrode pattern 110, and the spacing between the plurality of first thin metal wires 121 and the spacing between the plurality of second thin metal wires 122 are the same as the spacing between the plurality of first thin metal wires 111 and the spacing between the plurality of second thin metal wires 112 of the first electrode pattern 110, respectively.

In an end portion 110e of the first electrode pattern 110 adjacent to the insulation gap 130, a first end portion wire 111b extends in the first direction D1, and a second end portion wire 112b extends in the second direction D2 from an intersection position CP11 of the first thin metal wire 111 with the second thin metal wire 112. A first end surface 111a, which is a front end surface of the first end portion wire 111b, and a second end surface 112a, which is the front end surface of the second end portion wire 112b, face the insulation gap 130. The first electrode pattern 110 is composed of a basic pattern P1 that has a rhombic shape in plan view and that is repeated in each of the first direction D1 and the second direction D2, except for the first end portion wire 111b and the second end portion wire 112b.

Similarly, in an end portion 120e of the second electrode pattern 120 adjacent to the insulation gap 130, a first end portion wire 121b extends in the first direction D1, and a second end portion wire 122b extends in the second direction D2 from an intersection position CP12 of the first thin metal wire 121 with the second thin metal wire 122. A first end surface 121a, which is the front end surface of the first end portion wire 121b, and a second end surface 122a, which is the front end surface of the second end portion wire 122b, face the insulation gap 130. The second electrode pattern 120 is composed of the basic pattern P1 that has a rhombic shape in plan view and that is repeated in each of the first direction D1 and the second direction D2, except for the first end portion wire 121b and the second end portion wire 122b.

As illustrated in FIG. 5A, the first end portion wire 111b of the first electrode pattern 110 and the first end portion wire 121b of the second electrode pattern 120 form a pair with the insulation gap 130 therebetween, and the first end surfaces (first end surface 111a, first end surface 121a) of the first end portion wires (first end portion wire 111b, first end portion wire 121b) that form the pair are located so as to have portions facing each other with a predetermined distance therebetween in a direction intersecting the first direction D1 (more specifically, the width direction Dw of the insulation gap 130).

The first end portion wire 111b, which is an end portion of the first thin metal wire 111 of the first electrode pattern 110, is formed from a thin metal wire extending in the first direction D1 from the intersection position CP11. The first end portion wire 121b, which is an end portion of the first thin metal wire 121 of the second electrode pattern 120, is formed from a thin metal wire extending in the first direction D1 from the intersection position CP12.

As illustrated in FIG. 5A, if the thin metal wire forming the first end portion wire 111b is extended in the first direction D1, the spacing distance between an imaginary line V1 generated by the end portion of the thin metal wire adjacent to the second electrode pattern 120 and the end portion of the thin metal wire that forms the first end portion wire 121b adjacent to the first electrode pattern 110 is the same as the width of L1 of the thin metal wire. That is, the first end portion wire 111b of the first electrode pattern 110 and the first end portion wire 121b of the second electrode pattern 120 are formed from parts of two parallel thin metal wires that extend in the first direction D1 at a spacing distance L1 apart.

Since, as described above, the angle between the first direction D1 and the width direction Dw is ϕ, the spacing width in the width direction Dw between the two thin metal wires extending in the first direction D1 is L1/sin ϕ. Therefore, the first end portion wires (the first end portion wire 111b, the first end portion wire 121b), which form a pair with the insulation gap 130 therebetween, are disposed so as to be shifted from each other by L1/sin ϕ (a predetermined spacing) in a direction (the width direction Dw) intersecting the first direction D1.

Both the first end surface 111a and the first end surface 121a have a tapered shape that is cut in the longitudinal direction Dg. The shape makes it easier to shape the thin wire when the thin wire is formed and ensures the width of the insulation gap 130.

The second end portion wire 112b of the first electrode pattern 110 and the second end portion wire 122b of the second electrode pattern 120 form a pair with the insulation gap 130 therebetween, and the second end surfaces (the second end surface 112a, the second end surface 122a) of the second end portion wires (the second end portion wire 112b, the second end portion wire 122b) that form the pair are located so as to have portions facing each other at a predetermined distance therebetween in a direction intersecting the second direction D2 (more specifically, the width direction Dw).

The second end portion wire 112b, which is the end portion of the second thin metal wire 112 of the first electrode pattern 110, is formed from a thin metal wire extending from the intersection position CP11 in the second direction D2. The second end portion wire 122b, which is the end portion of the second thin metal wire 122 of the second electrode pattern 120, is formed from a thin metal wire extending from the intersection position CP12 in the second direction D2.

As illustrated in FIG. 5A, if the thin metal wire constituting the second end portion wire 112b is extended in the second direction D2, the spacing distance between an imaginary line V2 generated by the end portion of the thin metal wire adjacent to the second electrode pattern 120 and the end portion of the thin metal wire that constitutes the second end portion wire 122b adjacent to the first electrode pattern 110 is the same as the width L1 of the thin metal wire. That is, the second end portion wire 112b of the first electrode pattern 110 and the second end portion wire 122b of the second electrode pattern 120 are formed from parts of two parallel thin metal wires that extend in the second direction D2 at a spacing distance L1 apart.

Since, as described above, the angle between the second direction D2 and the width direction Dw is (I), the spacing width in the width direction Dw between the two thin metal wires extending in the second direction D2 is L1/sin φ. Therefore, the second end portion wires (the second end portion wire 112b, the second end portion wire 122b), which form the pair, are disposed so as to be shifted from each other by L1/sin φ (a predetermined spacing) in a direction (the width direction Dw) intersecting the second direction D2.

Both the second end surface 112a and the second end surface 122a have a tapered shape that is cut in the longitudinal direction Dg. The shape makes it easier to shape the thin wire when the thin wire is formed and ensures the width of the insulation gap 130.

Because, as described above, the paired end surfaces are appropriately separated, the electrode member 20 according to the present embodiment has a region where the first electrode pattern 110 and the second electrode pattern 120 do not overlap when viewed in the longitudinal direction Dg, and the region forms an insulation gap 130. For this reason, when, for example, the thin metal wires are formed from a metal film by a wet-etching process, an etchant of the material forming the thin metal wire can be easily discharged from the detection region 16 through the insulation gap 130. As a result, as compared with the electrode described in Japanese Unexamined Patent Application Publication No. 2016-192192, the electrode member 20 according to the present embodiment can properly ensure the processing accuracy of the thin metal wires located near the insulation gap 130, and etching residue is less likely to remain. In contrast, if the electrode described in Japanese Unexamined Patent Application Publication No. 2016-192192 is attempted to be formed by a wet process in the same manner, etchant is likely to remain in the region where the end portions of the band electrodes overlap. For this reason, the electrode described in Japanese Unexamined Patent Application Publication No. 2016-192192 may suffer a decrease in processing accuracy and remaining of residue due to over-etching. To reduce the visibility of the insulation gap 130 and properly reduce the residual etchant at the same time, it may be desirable that the width W1 of the insulation gap 130 be greater than or equal to 0.5 times and less than or equal to 3.5 times the width L1 of the thin metal wire (the first thin metal wires 111 and 121, the second thin metal wires 112 and 122).

In the metal pattern illustrated in FIGS. 4 and 5A, when W1=2L1/sin φ, the end surfaces (the first end surface 111a and the first end surface 121a, the second end surface 112a and the second end surface 122a) of the paired end portion wires (the first end portion wire 111b and the first end portion wire 121b, the second end portion wire 112b and the second end portion wire 122b) completely overlap as viewed in the width direction Dw. FIG. 5A illustrates the metal patterns in this case. If the width W1 of the insulation gap 130 is greater than that in this case, the overlap between the end surfaces of the paired end portion wires decreases as viewed in the width direction Dw. If W1>3L1/sin φ, the end surfaces do not overlap. To facilitate continuous visibility of the paired end portion wires, that is, to reduce the visibility of the insulation gap 130, it is desirable that the width W1 of the insulation gap 130 be less than or equal to 3L1/sin φ.

A lower limit of the width W1 of the insulation gap 130 is not set from the viewpoint of the visibility. However, from the viewpoint of reducing the influence of over-etching, it is desirable that the width W1 of the insulation gap 130 be greater than or equal to 0.5 times the width L1 of the thin metal wire, and it is more desirable that the width W1 be greater than or equal to 1 times the width L1.

To form such an overlapping portion when viewed in the width direction Dw, it is required that each of the sum of the lengths of the paired first end portion wires (the first end portion wire 111b, first end portion wire 121b) in the first direction D1 and the sum of the lengths of the paired second end portion wires (the second end portion wire 112b, the second end portion wire 122b) in the second direction D2 is greater than the length of each of the sides of the basic pattern P1. Such a configuration having the overlapping portion can reduce the visibility of the insulation gap 130 between the first electrode pattern 110 and the second electrode pattern 120 while ensuring the width of the insulation gap 130 and reducing the influence of over-etching.

Figure 5B:
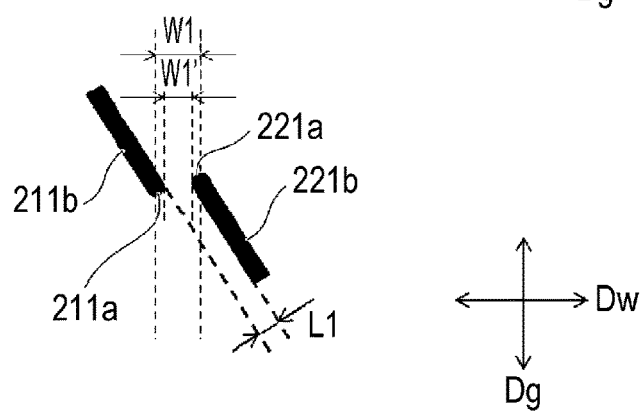
FIG. 5B is a plan view of the shape of a first end surface according to a modification.

FIG. 5B illustrates a modification of the shape of the first end surfaces 111a and 121a illustrated in FIG. 5A. The first end surfaces 111a and 121a illustrated in FIG. 5A have a tapered shape that is cut in the longitudinal direction Dg. When the thin metal wires including the end portion wires (the first end portion wire 111b, the first end portion wire 121b, the second end portion wire 112b, and the second end portion wire 122b) are formed by a wet-etching process, the removal process progresses isotropically and, thus, it is not easy to accurately form the above-described tapered shape. By curving the shape of the edge portion of the end portion wire, the shape accuracy of the processed shape can be increased.

More specifically, as illustrated in FIG. 5B, by employing a semicircular shape as the shape of a first end surface 211a of a first end portion wire 211b that extends in the first direction D1, a change in the shape of the end portion is less likely to occur even when etching is performed isotropically. In FIG. 5B, a first end surface 221a of a first end portion wire 221b is also semicircular.

When the first end surfaces 211a and 221a are semicircular in shape, the spacing distance between the end surfaces is slightly less than when the first end surfaces 111a and 121a are tapered in shape as illustrated in FIG. 5A. In the example illustrated in FIG. 5B, a width W1' of the insulation gap 130 is less than the width W1 of the insulation gap 130 illustrated in FIG. 5A and is about 70% of the width W1. Even in this case, if insulation is ensured between the first end portion wire 211b and the first end portion wire 221b facing each other and if a portion where the thin metal wires are not located can be seen through in the longitudinal direction Dg, a decrease in the processing accuracy due to over-etching can be prevented even when the thin metal wire is processed by a wet-etching process. Such a curved end surface shape is similarly applicable to the paired second end surfaces 112a and 122a adjacent to each other.

The end portion wires of the first electrode pattern 110 are herein collectively referred to as a third end portion wire, and the end portion wires of the second electrode pattern 120 are collectively referred to as a fourth end portion wire. Then, the third end portion wire and the fourth end portion wire that face each other across the insulation gap 130 and form a pair have an overlapping portion when viewed in the width direction Dw which is a fourth direction. More specifically, the first end portion wire 111b (which is the third end portion wire) and the first end portion wire 121b (which is the fourth end portion wire) that face each other across the insulation gap 130 and form a pair have an overlapping portion when viewed in the fourth direction (the width direction Dw). In addition, the second end portion wire 112b and the second end portion wire 122b that face each other across the insulation gap 130 and form a pair have an overlapping portion when viewed in the fourth direction (the width direction Dw). Due to the presence of the overlapping portion, the gap between the third end portion wire and the fourth end portion wire is less likely to be visible. However, when viewed in the third direction (the longitudinal direction Dg), the portion where the thin metal wire is not located can be seen through, and, thus, over-etching of the thin metal wires is appropriately reduced.

In the metal pattern illustrated in FIGS. 4 and 5A, one of the first electrode pattern 110 and the second electrode pattern 120 is shifted such that the first electrode pattern 110 and the second electrode pattern 120 are separated from each other by a width L1/sin φ in the width direction Dw of the insulation gap 130 (a direction perpendicular to the longitudinal direction Dg). More specifically, the second electrode pattern 120 is located at a position shifted relative to the first electrode pattern 110 by a width L1/sin φ to the right in the width direction Dw. In the example illustrated in FIG. 5B, one of the first electrode pattern 110 and the second electrode pattern 120 is also shifted such that the first electrode pattern 110 and the second electrode pattern 120 are separated by the width L1/sin φ of the insulation gap 130. That is, the basic pattern P1 of the first electrode pattern 110 and the basic pattern P1 of the second electrode pattern 120 are disposed so as to be separated from each other by L/sin φ in the fourth direction (the width direction Dw).

Then, each of the third end portion wire and the fourth end portion wire is disposed so that the thin metal wires that form part of the basic pattern P1 are at the positions based on repetition of the basic pattern P1. More specifically, the first electrode pattern 110 is formed by repetition of the above-described basic pattern P1 except for the third end portion wire (the first end portion wire 111b, the second end portion wire 112b). In contrast, each of the first end portion wire 111b and the second end portion wire 112b that constitute the third end portion wire has a configuration in which thin metal wires that form part of the basic pattern P1 are disposed at positions based on repetition of the above-described basic pattern P1. Similarly, the second electrode pattern 120 is formed by repetition of the above-described basic pattern P1 except for the fourth end portion wire (the first end portion wire 121b, the second end portion wire 122b). In contrast, the first end portion wire 121b and the second end portion wire 122b that constitute the fourth end portion wire have a configuration in which thin metal wires that form part of the above-described basic pattern P1 are disposed at positions based on repetition of the basic pattern P1. In the example illustrated in FIG. 5B, each of the third end portion wire (the first end portion wire 211b) and the fourth end portion wire (the first end portion wire 221b) has a configuration in which the thin metal wires that form part of the basic pattern P1 are disposed at a position based on repetition of the above-described basic pattern P1.

FIGS. 6, 7, 8, 9A, and 9B are conceptual plan views of the configurations of the first electrode pattern 110 and second electrode pattern 120 when the width W1 of the insulation gap 130 located between the third end portion wire and the fourth end portion wire is changed in the configuration of the present embodiment illustrated in FIGS. 4 and 5A. The width W1 of the insulation gap 130 is 1 times the width L1 of the first thin metal wires 111 and 121 in FIG. 6, 2 times the width L1 of the first thin metal wires 111 and 121 in FIG. 7, 3 times the width L1 of the first thin metal wires 111 and 121 in FIG. 8, 4 times the width L1 of the first thin metal wires 111 and 121 in FIG. 9A, and 5 times the width L1 of the first thin metal wires 111 and 121 in FIG. 9B.

In FIGS. 6, 7, 8, 9A, and 9B, the shift length (the pattern shift length) in the fourth direction (the width direction Dw) between the basic pattern P1 of the first electrode pattern 110 and the basic pattern P1 of the second electrode pattern is L1/(2×sin φ), which is a constant value. The pattern shift length is ½ of the pattern shift length between the first electrode pattern 110 and the second electrode pattern 120 illustrated in FIGS. 4 and 5A. Therefore, in the range where the width W1 of the insulation gap 130 satisfies 0.5×L1/sin φ≤W1≤2.5×L1/sin φ, when the paired third end portion wire and the fourth end portion wire are viewed in the fourth direction (the width direction Dw), the end surfaces of these end portion wires have an overlapping portion. In FIGS. 6, 7, 8, 9A, and 9B, the angle φ is 60°, so that in the range where the width W1 of the insulation gap 130 is about 0.7 to 3.5 times the width L1 of the first thin metal wires 111 and 121, the end surfaces of the paired third end portion wire and fourth end portion wire have an overlapping portion when viewed in the fourth direction (the width direction Dw).

Figure 6:
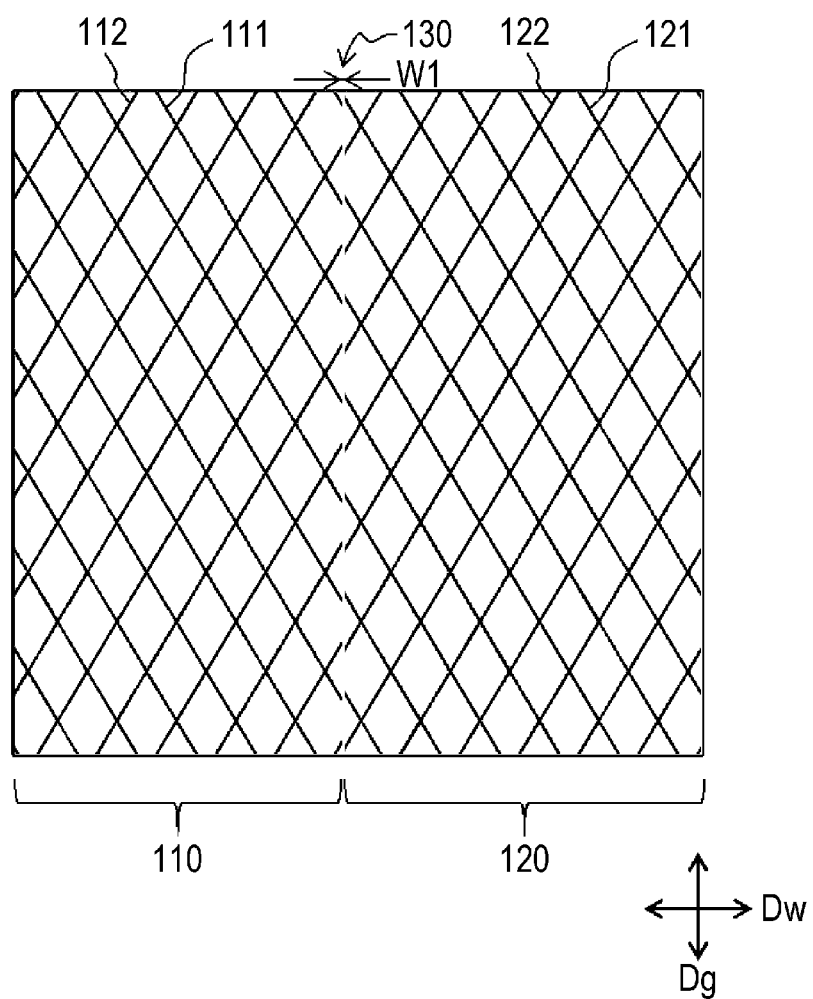
FIG. 6 is a conceptual plan view of the configuration of the first electrode pattern and the second electrode pattern when the width of an insulation gap is one times the width of a first thin metal wire according to the configuration of the embodiment.
Figure 7:
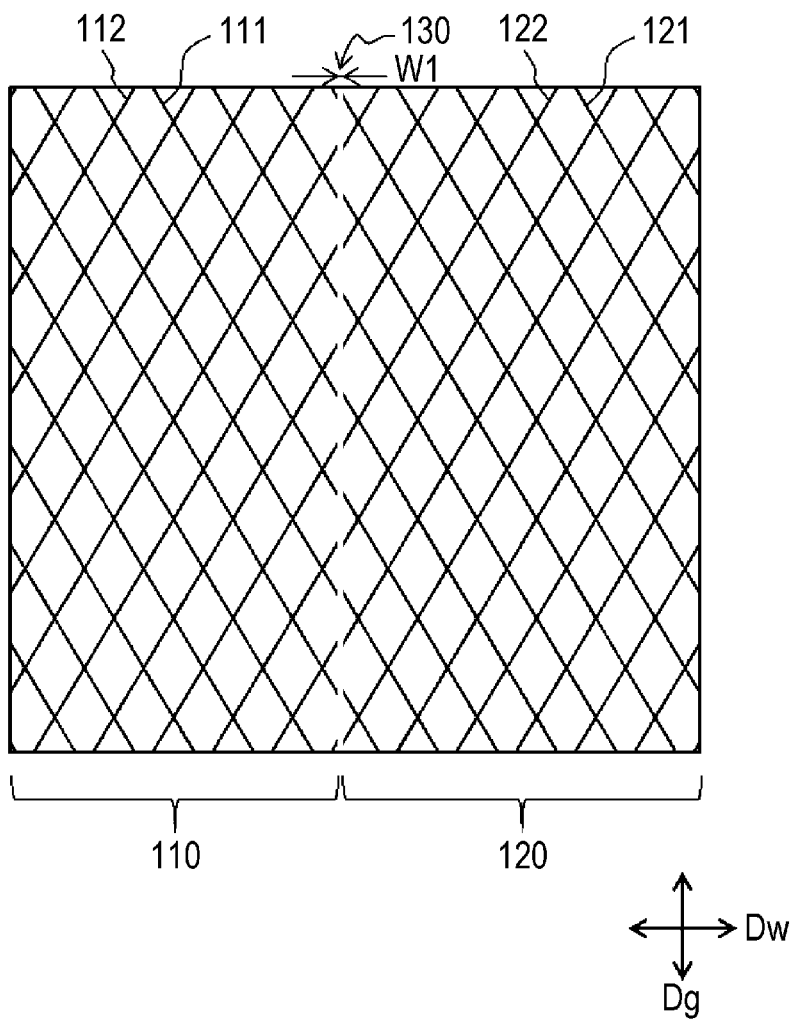
FIG. 7 is a conceptual plan view of the configuration of the first electrode pattern and second electrode pattern when the width of the insulation gap is twice the width of the first thin metal wire according to the configuration of the embodiment.
Figure 8:
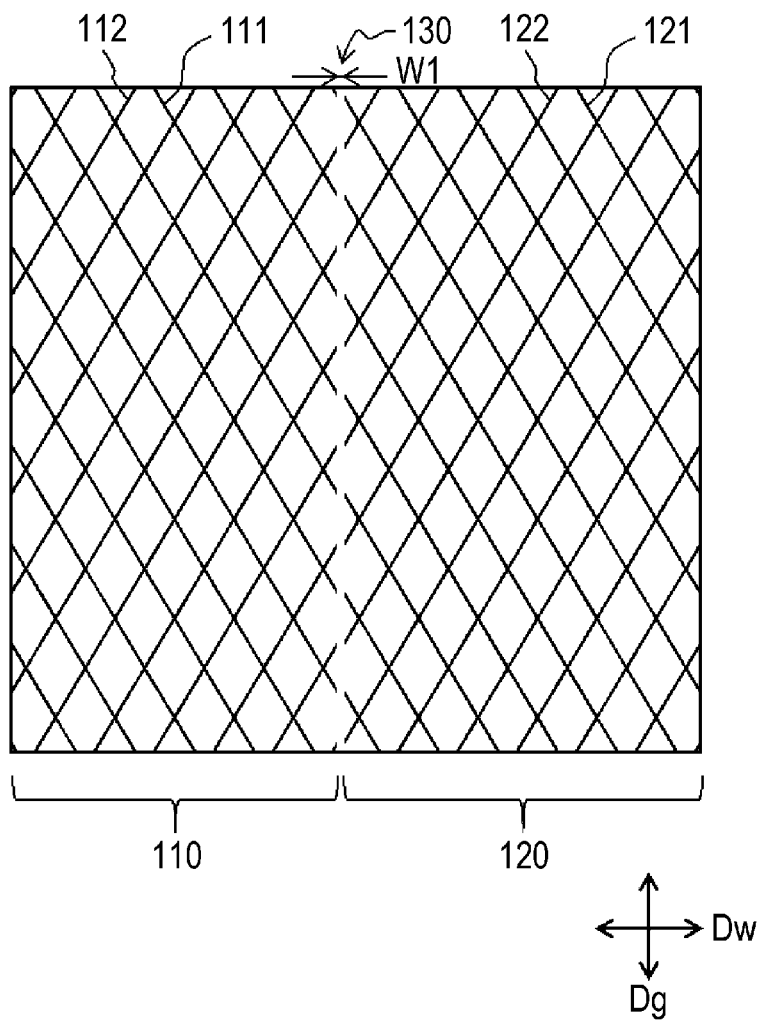
FIG. 8 is a conceptual plan view of the configuration of the first electrode pattern and second electrode pattern when the width of the insulation gap is three times the width of the first thin metal wire according to the configuration of the embodiment.

In the examples illustrated in FIGS. 6, 7, and 8, the width W1 of the insulation gap 130 is 1 to 3 times the width L1 of the first thin metal wires 111 and 121. Therefore, when viewed in the fourth direction (the width direction Dw), the paired third end portion wire and fourth end portion wire have an overlapping portion. As a result, these wires are likely to be continuously visible. That is, the insulation gap 130 is less likely to be visible.

Figure 9A:
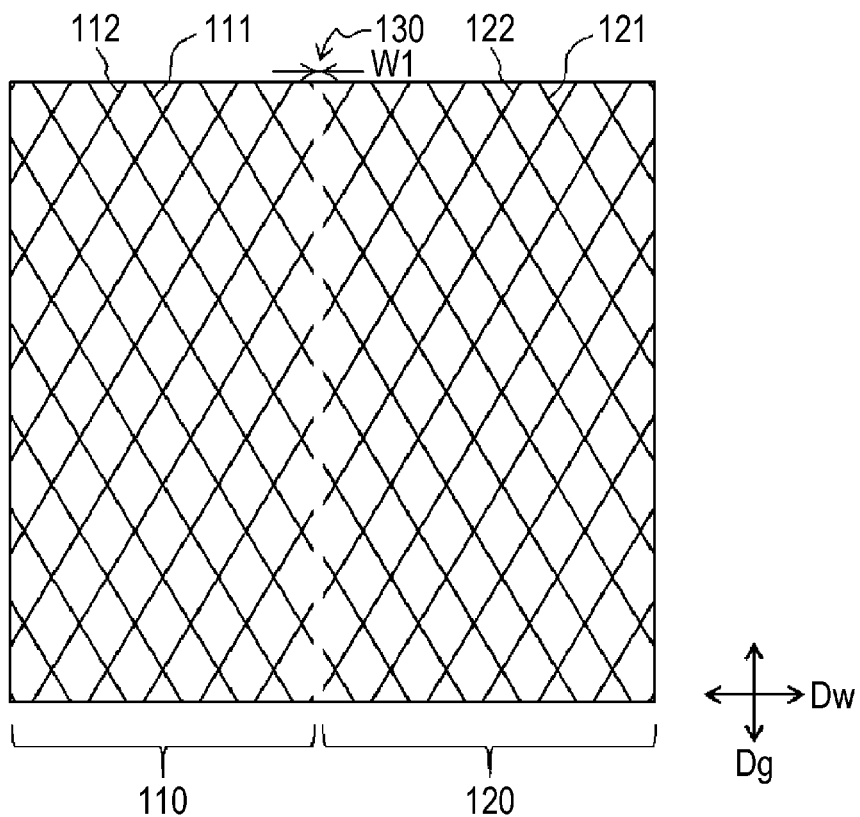
FIG. 9A is a conceptual plan view of the configuration of the first electrode pattern and second electrode pattern when the width of the insulation gap is four times the width of the first thin metal wire according to the configuration of the embodiment.
Figure 9B:
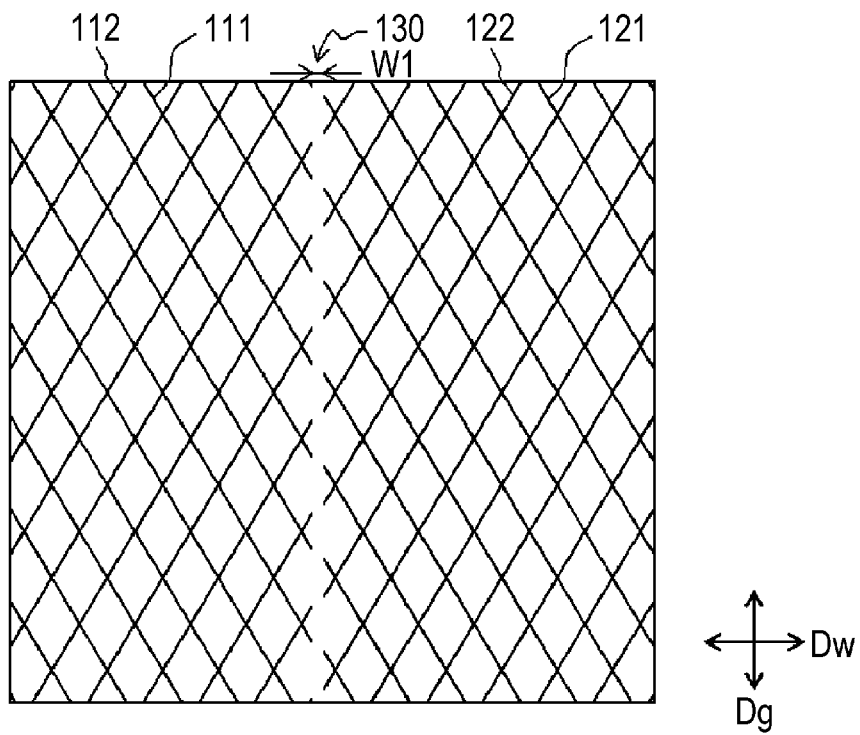
FIG. 9B is a conceptual plan view of the configuration of the first electrode pattern and second electrode pattern when the width of the insulation gap is five times the width of the first thin metal wire according to the configuration of the embodiment.

In the examples illustrated in FIGS. 9A and 9B, the width W1 of the insulation gap 130 is 4 and 5 times the width L1 of the first thin metal wires 111 and 121, respectively, so that the paired third end portion wire and fourth end portion wires have no overlapping portion when viewed in the fourth direction (the width direction Dw). Even in the configurations, when, for example, the pattern shift length is increased, the end portion wires (the third end portion wire, the fourth end portion wire) that face each other across the insulation gap 130 and form a pair increase in length in a direction in which the thin metal wires extend. As a result, the end portion wires that form the above-described pair have an overlapping portion when viewed in the fourth direction (the width direction Dw). Thus, the visibility of the insulation gap 130 can be reduced. More specifically, in FIG. 9A, the pattern shift length is L1/(2×sin φ). However, if the pattern shift length is L1/sin φ as in the metal pattern illustrated in FIG. 5A, the paired end portion wires (the third end portion wire, the fourth end portion wire) have an overlapping portion.

Figure 10A:
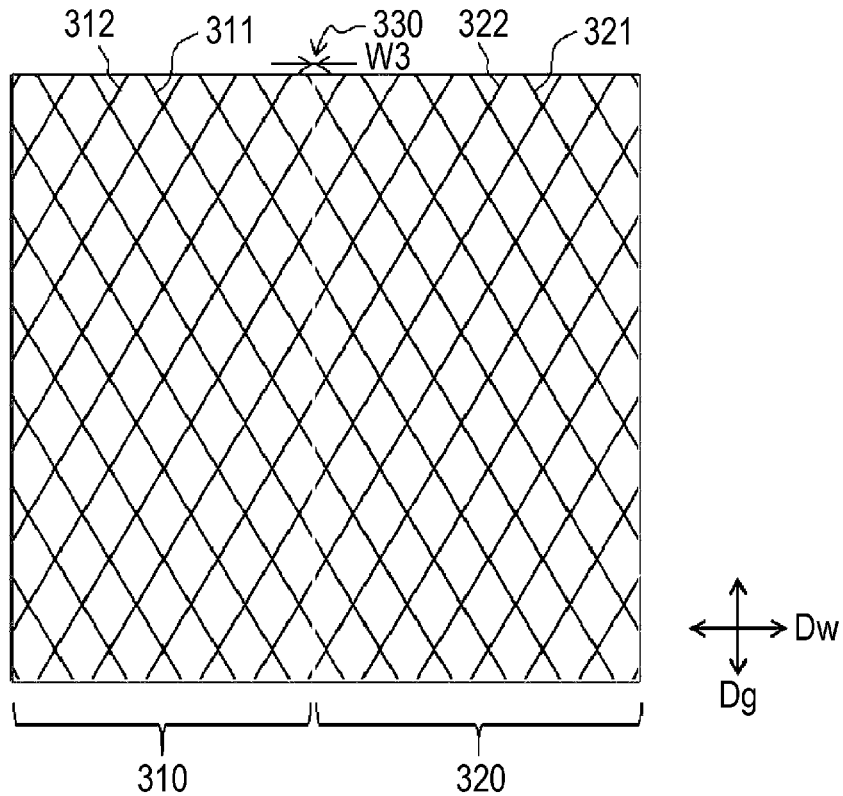
FIG. 10A is a conceptual plan view of the configuration of the first electrode pattern and second electrode pattern when the width of the insulation gap is one times the width of the first thin metal wire according to a comparative example.
Figure 10B:
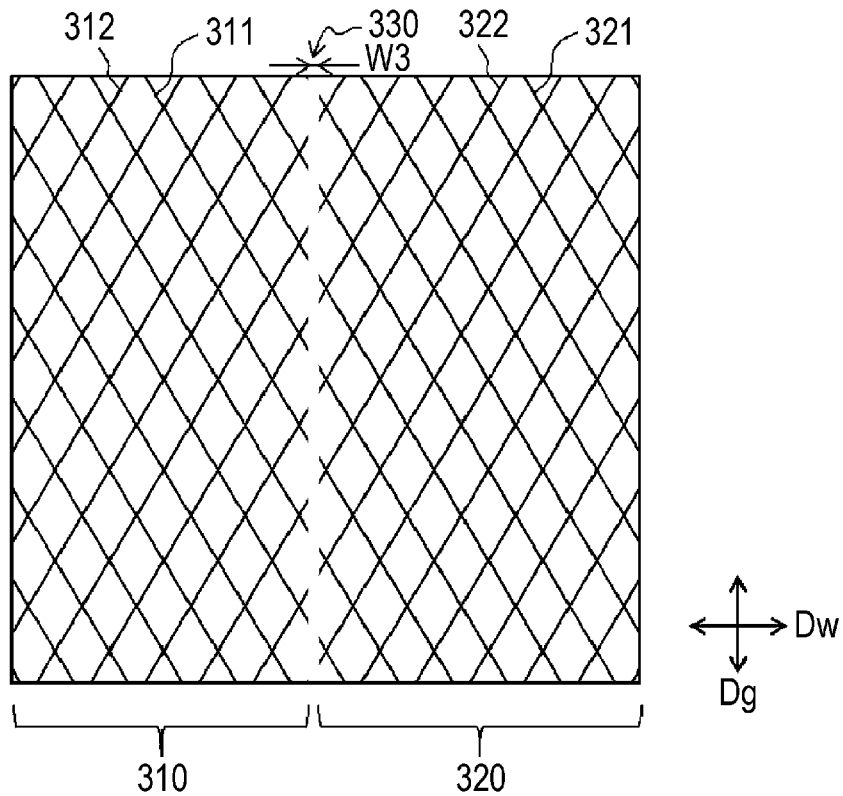
FIG. 10B is a conceptual plan view of the configuration of the first electrode pattern and second electrode pattern when the width of the insulation gap is four times the width of the first thin metal wire according to the comparative example.

FIGS. 10A and 10B are conceptual plan views of the configuration of a first electrode pattern 310 and a second electrode pattern 320 when the width W3 of an insulation gap 330 is changed in the configuration according to a comparative example.

In the comparative example illustrated in FIGS. 10A and 10B, the electrode patterns 310 and 320 are configured with first thin metal wires 311 and 321 and the second thin metal wires 312 and 322 each having a width the same as in the above-described embodiment using a rhombic pattern the same as the basic pattern P1 of the above-described embodiment. In addition, the first end portion wires of the first thin metal wires 311 and 321 that face each other across the insulation gap 330 and form a pair are disposed on the same straight line, and the second end portion wires of the second thin metal wires 312 and 322 that face each other across the insulation gap 330 and form a pair are disposed on the same straight line. Since the insulation gap 330 is provided so as to extend in the longitudinal direction Dg in a straight line, the first end surface of the first end portion wire and the second end surface of the second end portion wire have tapered shapes similar to the first end surface and the second end surface according to the present embodiment illustrated in FIGS. 6 to 8, respectively.

The width W3 of the insulation gap 330 according to the comparative example is 1 times the width L1 of the first thin metal wires 311 and 321 in FIG. 10A and four times the width L1 of the first thin metal wires 311 and 321 in FIG. 10B. In the configuration according to the comparative example, there is no pattern shift between the first electrode pattern 110 and the second electrode pattern 120, that is, the pattern shift length is 0. The insulation gap 330 having a width of W3 is disposed in part of continuous metal pattern, so that the first electrode pattern 110 and the second electrode pattern 120 are formed.

In the configuration illustrated in FIG. 10A, because the insulation gap 330 is small, it is likely that the thin metal wire of the first electrode pattern 310 and the thin metal wire of the second electrode pattern 320 are continuously visible. However, in such a configuration, the end portion wire tends to be over-etched from the front end during an etching process. If over-etching occurs, the end portion wire recedes in a direction in which the thin metal wire extends in both the longitudinal direction Dg and the width direction Dw. As a result, the spacing distance between the paired end portion wires easily increase. In contrast, according to the configuration of the present embodiment illustrated in FIGS. 6 to 9, in the case where although the front ends of the end portion wires (the third end portion wire, the fourth end portion wire) disappear due to over-etching, only an overlapping portion of the wires disappear as viewed in the width direction Dw, an increase in the spacing distance between the paired end portion wires is not noticeable at all. As a result, even if over-etching occurs on the end portion wire, the invisibility of the insulation gap 130 is easily maintained.

The above-described configuration enables the capacitive touch sensor 10 according to the present embodiment to reduce the visibility of the thin metal wires in the first electrode pattern 110 and the second electrode pattern 120 that are adjacent to each other with the insulation gap 130 therebetween. Thus, the thin metal wires adjacent to each with other with the insulation gap 130 therebetween can be easily recognized as if the adjacent thin metal wires are continuous, and a desired shape of the thin metal wire can be obtained by reducing over-etching of the thin metal wire.

Figure 11:
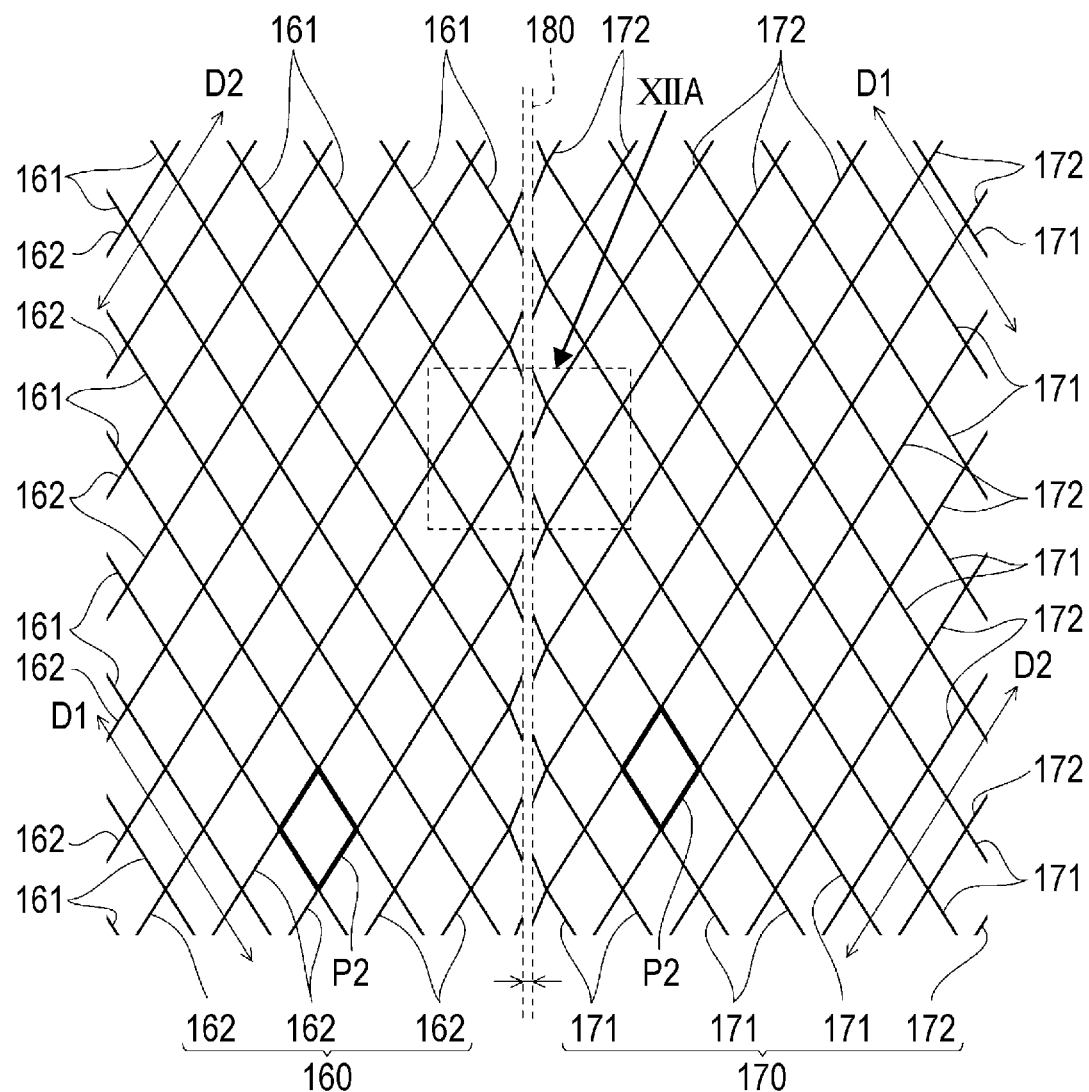
FIG. 11 is a conceptual plan view of the configuration of the first electrode pattern and second electrode pattern according to a modification.
Figure 11:
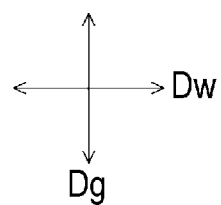
Figure 12A:
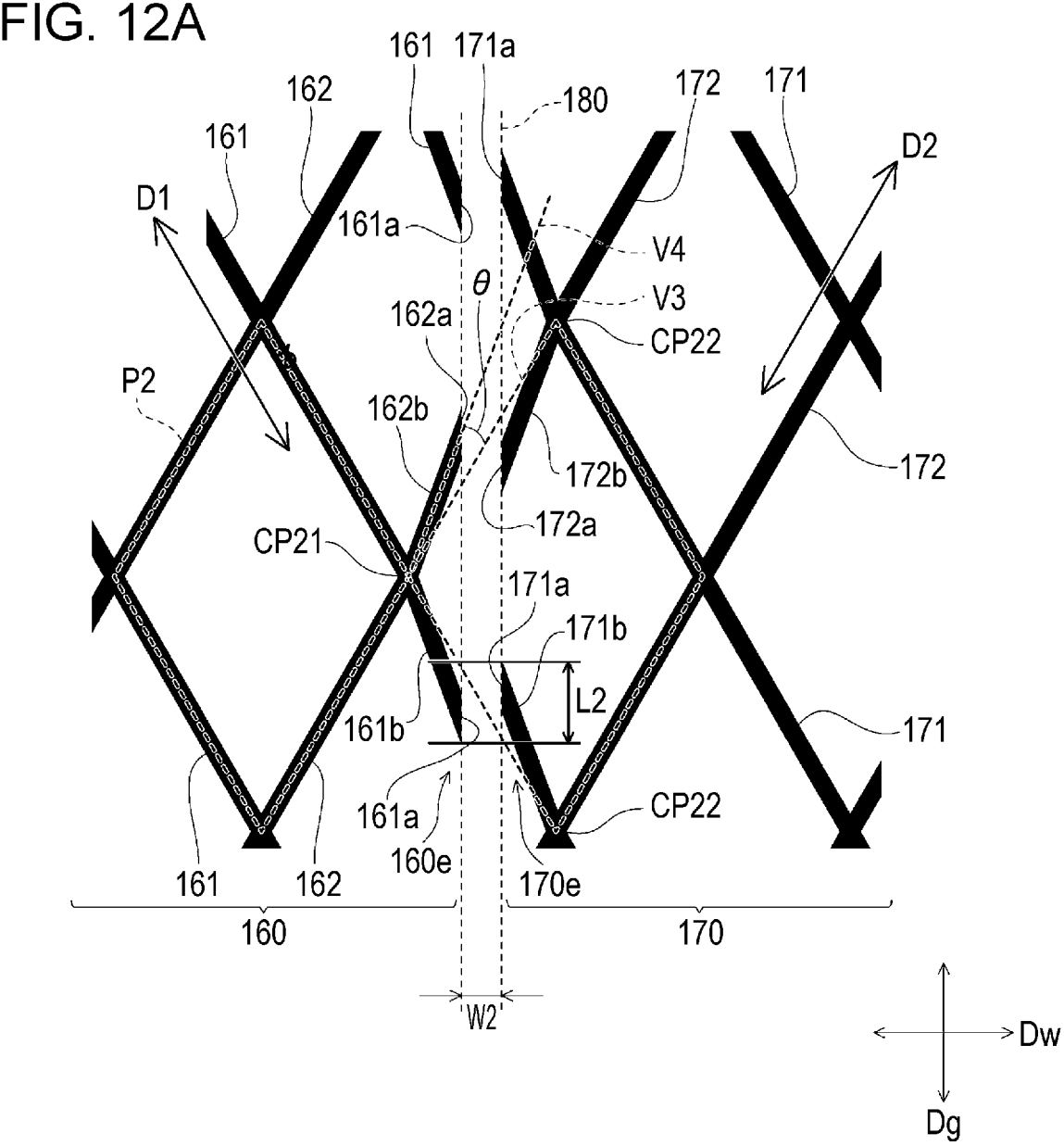
FIG. 12A is an enlarged plan view of a portion XIIA illustrated in FIG. 11.

Modifications are described below. FIG. 11 is a plan view of the configuration of a first electrode pattern and a second electrode pattern according to the modification. FIG. 12A is an enlarged plan view of a portion XIIA illustrated in FIG. 11. Like the first electrode pattern 110 and the second electrode pattern 120 according to the above-described embodiment, in the electrode patterns illustrated in FIGS. 11 and 12A, a first electrode pattern 160 and a second electrode pattern 170 are disposed adjacent to each other with an insulation gap 180 having a predetermined width W2 therebetween and are isolated from each other by the insulation gap 180. The first electrode pattern 160 and the second electrode pattern 170 are two electrode patterns adjacent to each other while being insulated from each other.

The first electrode pattern 160 is formed in a mesh-like shape with a plurality of first thin metal wires 161 extending in a first direction D1 and a plurality of second thin metal wires 162 extending in a second direction D2 that intersects the first direction D1. The second electrode pattern 170 is formed in a mesh-like shape with a plurality of first thin metal wires 171 each extending in the above-described first direction D1 and a plurality of second thin metal wires 172 each extending in the above-described second direction D2. The first direction D1 and the second direction D2 are the same as those in the above-described embodiment and are different from the direction in which the insulation gap 180 extends (the longitudinal direction Dg).

The first thin metal wire 161 and the second thin metal wire 162 in the first electrode pattern 160 and the first thin metal wire 171 and second thin metal wire 172 in the second electrode pattern 170 are configured in the same manner as in the above-described embodiment, except for the end portion wires.

According to the embodiment illustrated in FIGS. 4 and 5A, the first end portion wires 111*b* and 121*b* extend in the first direction D1, and the second end portion wires 112*b* and 122*b* extend in the second direction D2. However, according to the modification illustrated in FIGS. 11 and 12, a first end portion wire 161*b* of the first electrode pattern 160 extends in an end portion 160*e* adjacent to the insulation gap 180, and a first end portion wire 171*b* of the second electrode pattern 170 extends in an end portion 170*e* adjacent to the insulation gap 180. In the plan view illustrated in FIG. 12, the first end portion wires 161*b* and 171*b* each extend at an angle θ clockwise from the first direction D1. A second end portion wire 162*b* of the first electrode pattern 160 extends in the end portion 160*e* adjacent to the insulation gap 180, and the second end portion wire 172*b* of the second electrode pattern 170 extends in the end portion 170*e* adjacent to the insulation gap 180. The second end portion wires 162*b* and 172*b* each extend at an angle θ counterclockwise from the second direction D2 in plan view. The angle θ is greater than zero and less than the angle formed by the first direction D1 and the second direction D2 in both the clockwise and counterclockwise directions in plan view.

That is, the first end portion wire 161*b* of the first electrode pattern 160 and the first end portion wire 171*b* of the second electrode pattern 170 have portions that extend while tilting from the first direction D1 in opposite directions. More specifically, the entirety of the end portion wires extend in a direction having a component of a direction (the width direction Dw of the insulation gap 180) intersecting the first direction D1 so as to be separated by a predetermined distance (the width W2 of the insulation gap 180) in the direction (the width direction Dw) intersecting the first direction D1.

The second end portion wire 162*b* of the first electrode pattern 160 and the second end portion wire 172*b* of the second electrode pattern 170 have portions that extend while tilting from the second direction D2 in opposite directions. More specifically, the entirety of the end portion wires extend in a direction having a component of a direction (the width direction Dw) intersecting the second direction D2 so as to be separated by the predetermined distance (the width W2) in the direction (the width direction Dw) intersecting the second direction D2.

The first end portion wire 161*b* of the first electrode pattern 160 linearly extends from an intersection position CP21 with the second thin metal wire 162 in a direction intersecting the first direction D1 in plan view, and the first end portion wire 171*b* of the second electrode pattern 170 linearly extends from an intersection position CP22 with the second thin metal wire 172 in a direction intersecting the second direction D2 in plan view. The second end portion wire 162*b* of the first electrode pattern 160 linearly extends from the intersection position CP21 with the second thin metal wire 162 in a direction intersecting the first direction D1 in plan view, and the second end portion wire 172b of the second electrode pattern 170 linearly extends from the intersection position CP22 with the second thin metal wire 172 in a direction intersecting the second direction D2 in plan view.

According to the above-described configuration, the first end portion wire 161b of the first electrode pattern 60 and the first end portion wire 171b of the second electrode pattern 170 form a pair with the insulation gap 180 therebetween, and the first end surfaces (the first end surface 161a, the first end surface 171a) of the paired first end portion wires (the first end portion wire 161b, the first end portion wire 171b) are positioned so as to have portions facing each other with a predetermined distance (more specifically, the width W2) therebetween in a direction that intersects the first direction D1 (more specifically, the width direction Dw).

The insulation gap 180 is disposed between the first electrode pattern 160 and the second electrode pattern 170 so that a portion where a thin metal wire is not located can be seen through when viewed in the third direction, which is the direction in which the insulation gap 180 extends (the longitudinal direction Dg). The paired end portion wires (the first end portion wire 161b belonging to the third end portion wire, the first end portion wire 171b belonging to the fourth end portion wire) face each other across the insulation gap 180 and have an overlapping portion when viewed in the fourth direction (the width direction Dw) perpendicular to the third direction (the longitudinal direction Dg). The length of the overlapping portion in the third direction (the longitudinal direction Dg) is L2.

As illustrated in FIG. 11, according to the present modification, a basic pattern P2 that constitutes the first electrode pattern 160 and a basic pattern P2 that constitutes the second electrode pattern 170 are identical in shape. In addition, there is no positional shift between the two basic patterns P2 in the fourth direction (the width direction Dw), unlike the example illustrated in FIG. 4. According to the present modification, as illustrated in FIG. 12A, the two third end portion wires (the first end portion wire 161b, the second end portion wire 162b) and the two fourth end portion wires (the first end portion wire 171b, the second end portion wire 172b) are each disposed such that part of the basic pattern P2 is offset from the locations based on repetition of the basic pattern P2.

Figure 12B:
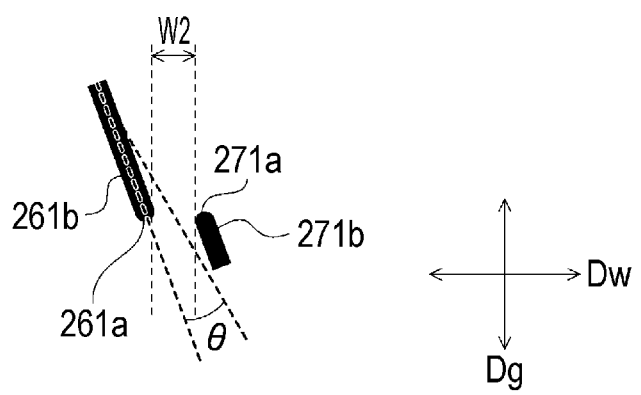
FIG. 12B is a plan view of the shape of a first end surface according to a modification.

FIG. 12B illustrates a modification of the shape of the first end surface illustrated in FIG. 12A. Like the two first end surfaces 161a and 171a that are adjacent to each other and form a pair in FIG. 12A, the first end surface 261a of the first end portion wire 261b and the first end surface 271a of the first end portion wire 271b illustrated in FIG. 12B are separated with a predetermined spacing corresponding to the width W2 of the insulation gap 180 therebetween. The first end surfaces 261a and 271a each have a curved surface shape (more specifically, a semicircular shape) in plan view and face each other across the insulation gap 180. This configuration increases the shape stability when the thin metal wires are formed and reduces variation in the width W2 of the insulation gap 180. This tendency is more prominent when the thin metal wires are formed by a wet-etching process. The curved surface shape is also applicable to the second end surfaces 162a and 172a that are adjacent to each other and form a pair.

In the above-described embodiment and the modifications, the first end portion wire may extend from a position different from the intersection position with the second thin metal wire, for example, a position closer to or farther from the insulation gap than the intersection position. This is also the case for the second end portion wire. The second end portion wire may extend from a position different from the intersection position with the first thin metal wire, for example, a position closer to or farther from the insulation gap than the intersection position. The first end portion wire and the second end portion wire may have a shape including a curved shape in plan view as long as the end surfaces (the first end surface and the second end surface) of the first end portion wire and the second end portion wire have portions facing each other.

Alternatively, as illustrated in, for example, FIGS. 4 and 5, when the basic pattern P1 of the first electrode pattern 110 and the basic pattern P1 of the second electrode pattern 120 are shifted from each other in the width direction Dw, the direction in which the basic pattern P1 is shifted may have a component in the longitudinal direction Dg. Still alternatively, as illustrated in FIGS. 11 and 12, the thin metal wire that constitute the end portion wire may be disposed at a position shifted from the basic pattern P1.

While the present invention has been described with reference to the above-described embodiment, the invention is not limited to the above-described embodiment. Improvement and change can be made within the purpose of improvement or within the scope of the invention.

What is claimed is:

1. An electrode member comprising:
   a first electrode pattern and a second electrode pattern formed on a substrate such that the first electrode pattern and the second electrode pattern are disposed adjacent to each other with an insulation gap formed therebetween in a plan view from a direction normal to the substrate, the insulation gap extending in a longitudinal direction and having a width in a width direction perpendicular to the longitudinal direction,
   wherein each of the first electrode pattern and the second electrode pattern has a same mesh-like pattern formed of a plurality of first thin metal wires extending in a first direction and a plurality of second thin metal wires extending in a second direction that intersects the first direction, both of the first direction and the second direction intersecting the longitudinal direction, the mesh-like pattern including a base pattern repeating along the first direction and the second direction,
   wherein the insulation gap separates the second electrode pattern from the first electrode pattern, such that the base pattern in the second electrode pattern is shifted in the width direction with respect to the base pattern of the first electrode pattern,
   wherein the first thin metal wires include first end wires each having a first end at an edge of the first electrode pattern or at an edge of the second electrode pattern along the insulation gap, such that each of the first end wires in the first electrode pattern and corresponding one of the first end wires in the second electrode pattern form a pair such that the respective first ends of the first end wires face each other across the insulation gap with a predetermined distance therebetween in the width direction,
   wherein the second thin metal wires include second end wires each having a second end at the edge of the first electrode pattern or at the edge of the second electrode pattern along the insulation gap, such that each of the second end wires in the first electrode pattern and corresponding one of the second end wires in the second electrode pattern form a pair and face each other across the insulation gap with a predetermined distance therebetween in the width direction, and wherein the pair of the first end wires and the pair of the second end wires do not extend into the insulation gap viewed from the longitudinal direction, the pair of the first end wires extending in the first direction in parallel to each other with a predetermined distance therebetween in a direction perpendicular to the first direction, and the pair of the second end wires extending in the second direction in parallel to each other with a predetermined distance therebetween in a direction perpendicular to the second direction.

2. The electrode member according to claim 1, wherein each of the first end and the second end has a tapered shape in the plan view such that an edge of each of the first end and the second end aligns with the longitudinal direction.

3. The electrode member according to claim 1, wherein each of the first end and the second end has an edge having a curved shape in the plan view.

4. The electrode member according to claim 1, wherein the insulation gap has a predetermined width greater than or equal to 0.5 times a width of the first thin metal wire, and smaller than or equal to 3.5 times the width of the first thin metal wire.

5. An electrode member comprising:

a first electrode pattern and a second electrode pattern formed on a substrate such that the first electrode pattern and the second electrode pattern are disposed adjacent to each other with an insulation gap formed therebetween in a plan view from a direction normal to the substrate, the insulation gap extending in a longitudinal direction and having a width in a width direction perpendicular to the longitudinal direction, wherein each of the first electrode pattern and the second electrode pattern has a mesh-like pattern formed of a plurality of first thin metal wires extending in a first direction and a plurality of second thin metal wires extending in a second direction that intersects the first direction, both of the first direction and the second direction intersecting the longitudinal direction, wherein the first thin metal wires include first end wires each including an angled portion which extends at an angle to the first direction and has a first end at an edge of the first electrode pattern or at an edge of the second electrode pattern along the insulation gap, such that each of the first end wires in the first electrode pattern and corresponding one of the first end wires in the second electrode pattern form a pair such that the respective first ends of the angled portions face each other with a predetermined distance therebetween in the width direction, and wherein the second thin metal wires include second end wires each including an angled portion which extends at an angle to the second direction and has a second end at the edge of the first electrode pattern or at the edge of the second electrode pattern along the insulation gap, such that each of the second end wires in the first electrode pattern and corresponding one of the second end wires in the second electrode pattern form a pair such that the respective second ends of the angled portion face each other with the predetermined distance therebetween in the width direction, and wherein the respective angled portions of the first end wires and the second end wires do not extend into the insulation gap viewed from the longitudinal direction such that the predetermined distance in the width direction defines the width of the insulation gap along the longitudinal direction.

6. The electrode member according to claim 5, wherein the first end wire extends at the angle to the first direction toward the insulation gap from an intersection position at which the first thin metal wire intersects the second thin metal wire, and wherein the second end wire extends at the angle to the second direction toward the insulation gap from an intersection position at which the second thin metal wire intersects the first thin metal wire.

7. An electrode member comprising:

a first electrode pattern and a second electrode pattern provided on a substrate adjacent to each other with an insulation gap disposed therebetween in a plan view from a normal direction normal to the substrate, the insulation gap extending in an extending direction, wherein the first electrode pattern has a pattern formed of first thin metal wires, the first thin metal wires including first end wires each having a first end portion in a vicinity of the insulation gap, and the patten of the first thin metal wires is formed by repeating a base pattern, the first end wires being in conformity with the repeating base pattern, wherein the second electrode pattern has a pattern formed of the second thin metal wires, the second thin metal wires including second end wires each having a second end portion in a vicinity of the insulation gap, and the patten of the second thin metal wires is formed by repeating the base pattern, the second end wires being in conformity with the repeating base pattern, wherein the repeating base pattern of the first electrode pattern and the repeating base pattern of the second electrode pattern are shifted from each other at the insulation gap in a perpendicular direction perpendicular to the extending direction, wherein each of the first end wires and corresponding one of the second end wires form a pair, such that the first end portion and the second end portion of the pair face each other across the insulation gap with a predetermined spacing therebetween in the perpendicular direction, wherein the first and second end portions do not extend into the insulation gap viewed from the extending direction of the insulation gap, while the first and second end portions of the pair overlap each other viewed from the perpendicular direction, and wherein the first end wire and the second end wire which form the pair extend in a first direction intersecting the extending direction and the perpendicular direction, such that the first end wire and the second end wire are parallel to each other with a predetermined distance therebetween in a direction perpendicular to the first direction.

8. The electrode member according to claim 7, wherein the predetermined distance between the first end wire and the second end wire of the pair is substantially equal to a width of the thin metal wires.

9. The electrode member according to claim 7, wherein the predetermined spacing between the first end portion and the second end portion of the pair defines a width of the insulation gap.

10. The electrode member according to claim 9, wherein the width of the insulation gap is equal to or greater than a half the width of the thin metal wires and equal to or smaller than 3.5 times the width of the thin metal wires.

\* \* \* \* \*